United States Patent
Fuller et al.

(10) Patent No.: US 6,201,950 B1
(45) Date of Patent: *Mar. 13, 2001

(54) COMPUTER-CONTROLLED PAGING AND TELEPHONE COMMUNICATION SYSTEM AND METHOD

(75) Inventors: Robert M. Fuller, Issaquah, WA (US); Richard P. Berg, Thousand Oaks, CA (US)

(73) Assignee: Aspect Telecommunications Corporation, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 08/310,908

(22) Filed: Sep. 22, 1994

Related U.S. Application Data

(63) Continuation-in-part of application No. 08/210,347, filed on Mar. 18, 1994, now Pat. No. 5,825,867, which is a continuation-in-part of application No. 07/480,242, filed on Feb. 15, 1990, now Pat. No. 5,375,161, which is a continuation-in-part of application No. 07/439,601, filed on Nov. 21, 1989, now abandoned, which is a continuation-in-part of application No. 06/841,931, filed on Mar. 20, 1986, now Pat. No. 4,893,335, which is a continuation-in-part of application No. 06/650,821, filed on Sep. 14, 1984, now abandoned.

(51) Int. Cl.[7] .................................................. H04Q 7/38
(52) U.S. Cl. ..................................... 455/31.2; 455/461
(58) Field of Search ................................. 379/58, 59, 60, 379/61, 63, 57, 201, 202, 215, 217, 113, 106.06, 102, 199, 157; 340/825.44; 455/33.1, 33.2, 31.2, 421, 458, 412; 370/94.1

(56) References Cited

U.S. PATENT DOCUMENTS

Re. 32,365   3/1987   Sebestyen .
2,272,947   12/1942   Nilsson .
2,957,047   10/1960   Wennemer .
2,966,554   12/1960   Dubois .
3,178,516   4/1965   Bonanno .
3,182,134   5/1965   Hochgraf .
3,506,791   4/1970   Halaby .
3,614,328   10/1971   McNaughton et al. .
3,627,955 * 12/1971   Stone, Jr. ............................. 455/31.2

(List continued on next page.)

FOREIGN PATENT DOCUMENTS 2929961   7/1979   (DE) .
31 37 204   3/1983   (DE) .
3411206   10/1985   (DE) .

(List continued on next page.)

OTHER PUBLICATIONS

Mason, "Pagenet Takes next Voice Messaging Step", Wireless Week, Jul. 1996.*
(NEC Corp.) Patent Abstracts of Japan, vol. 13, No. 435, 1989.
(NEC Corp.) Patent Abstracts of Japan, vol. 12, No. 414, 1988.

(List continued on next page.)

Primary Examiner—Dwayne D. Bost
Assistant Examiner—Myren K. Wyche
(74) Attorney, Agent, or Firm—Ladas & Parry

(57) ABSTRACT

The invention provides a method and an apparatus for placing a caller into telecommunication with a subscriber. A call from the caller, directed to the subscriber, is detected and, in response thereto, a page is initiated to the subscriber and at the same time a forward leg call is initiated to a stored telephone address. If the call on the forward leg is answered, the party answering that call is placed in telecommunication with the caller. A call from the subscriber is also detected the subscriber is placed in telecommunication with the caller together with any party on a forward leg call.

29 Claims, 16 Drawing Sheets

U.S. PATENT DOCUMENTS

| | | | |
|---|---|---|---|
| 3,676,603 | 7/1972 | Budrys et al. ......................... | 379/217 |
| 3,704,346 | 11/1972 | Smith et al. . | |
| 3,739,329 | 6/1973 | Lester ..................... | 379/201 |
| 3,784,721 | 1/1974 | Kilby . | |
| 3,800,283 | 3/1974 | Gropper . | |
| 3,809,824 | 5/1974 | Dahlquist et al. . | |
| 3,854,013 | 12/1974 | Altenburger et al. . | |
| 3,898,390 * | 8/1975 | Wells et al. ............................ | 379/59 |
| 3,925,622 | 12/1975 | Robinson . | |
| 3,959,600 | 5/1976 | Sousa . | |
| 3,963,873 | 6/1976 | Pommerening et al. . | |
| 3,973,200 | 8/1976 | Akerberg . | |
| 3,997,731 | 12/1976 | Wilmot et al. ......................... | 379/201 |
| 4,028,498 | 6/1977 | Mehaffey et al. . | |
| 4,028,500 | 6/1977 | McClure et al. . | |
| 4,054,756 | 10/1977 | Comella et al. . | |
| 4,065,642 | 12/1977 | McClure . | |
| 4,069,397 | 1/1978 | Hashimoto ............................. | 379/77 |
| 4,071,699 | 1/1978 | Jovic et al. . | |
| 4,072,824 | 2/1978 | Phillips . | |
| 4,086,438 | 4/1978 | Kahn et al. . | |
| 4,107,473 * | 8/1978 | Pierce ..................... | 379/157 |
| 4,144,409 | 3/1979 | Utano et al. . | |
| 4,150,255 | 4/1979 | Theis et al. . | |
| 4,154,988 | 5/1979 | Fechalos et al. . | |
| 4,162,377 | 7/1979 | Mearns . | |
| 4,187,498 | 2/1980 | Creekmore . | |
| 4,188,507 * | 2/1980 | Meri et al. ............................ | 379/57 |
| 4,191,860 | 3/1980 | Weber . | |
| 4,209,787 | 6/1980 | Freeny, Jr. . | |
| 4,266,098 | 5/1981 | Novak . | |
| 4,266,102 | 5/1981 | Stanley et al. . | |
| 4,277,649 | 7/1981 | Sheinbein . | |
| 4,278,844 | 7/1981 | Jones ..................... | 379/201 |
| 4,296,282 | 10/1981 | O'Neil et al. . | |
| 4,298,775 | 11/1981 | Buck et al. . | |
| 4,313,025 | 1/1982 | Grube, Jr. . | |
| 4,313,035 | 1/1982 | Jordan et al. . | |
| 4,326,123 | 4/1982 | Hosterman . | |
| 4,332,985 | 6/1982 | Samuel . | |
| 4,336,524 | 6/1982 | Levine . | |
| 4,342,882 | 8/1982 | Gravenhorst et al. . | |
| 4,345,113 | 8/1982 | Shelley . | |
| 4,352,955 | 10/1982 | Kai et al. . | |
| 4,361,851 | 11/1982 | Asip et al. . | |
| 4,369,339 | 1/1983 | Castro et al. . | |
| 4,371,752 | 2/1983 | Matthews et al. . | |
| 4,393,278 | 7/1983 | Miyoshi . | |
| 4,413,158 | 11/1983 | Danford . | |
| 4,420,656 | 12/1983 | Freeman ............................... | 379/199 |
| 4,424,418 * | 1/1984 | Moore et al. . | |
| 4,439,636 | 3/1984 | Newkirk et al. . | |
| 4,442,321 | 4/1984 | Stehman ..................... | 179/18 |
| 4,447,676 | 5/1984 | Harris et al. . | |
| 4,459,434 | 7/1984 | Benning et al. . | |
| 4,475,009 | 10/1984 | Rais et al. . | |
| 4,481,384 | 11/1984 | Matthews . | |
| 4,488,005 | 12/1984 | Frantz . | |
| 4,503,288 | 3/1985 | Kessler . | |
| 4,538,031 | 8/1985 | Benning et al. . | |
| 4,567,323 | 1/1986 | Lottes et al. . | |
| 4,577,062 | 3/1986 | Hilleary . | |
| 4,577,067 | 3/1986 | Levy et al. . | |
| 4,578,540 | 3/1986 | Borg et al. . | |
| 4,580,012 | 4/1986 | Matthews et al. . | |
| 4,580,016 | 4/1986 | Williamson . | |
| 4,581,486 | 4/1986 | Matthews et al. . | |
| 4,584,434 | 4/1986 | Hashimoto ..................... | 179/100 |
| 4,585,906 | 4/1986 | Matthews et al. . | |
| 4,587,379 | 5/1986 | Masuda . | |
| 4,591,664 | 5/1986 | Freeman ............................... | 379/212 |
| 4,595,983 | 6/1986 | Gehalo et al. . | |
| 4,598,179 | 7/1986 | Clark et al. ............................ | 379/200 |
| 4,601,064 | 7/1986 | Shipley . | |
| 4,602,129 | 7/1986 | Matthews et al. . | |
| 4,604,499 | 8/1986 | Hughes . | |
| 4,607,144 | 8/1986 | Carmon et al. . | |
| 4,608,458 | 8/1986 | Hashimoto ............................. | 179/79 |
| 4,608,460 | 8/1986 | Carter et al. . | |
| 4,611,094 | 9/1986 | Asmuth et al. ..................... | 379/201 |
| 4,611,096 | 9/1986 | Asmuth et al. . | |
| 4,613,730 | 9/1986 | Fechalos et al. . | |
| 4,618,860 * | 10/1986 | Mori ..................... | 379/57 |
| 4,625,081 | 11/1986 | Lotito et al. . | |
| 4,625,276 | 11/1986 | Benton et al. . | |
| 4,626,630 | 12/1986 | Waldman . | |
| 4,640,991 | 2/1987 | Matthews et al. . | |
| 4,642,425 * | 2/1987 | Guinn et al. ............................ | 379/57 |
| 4,644,351 * | 2/1987 | Zabarsky et al. .............. | 340/852.44 |
| 4,645,879 | 2/1987 | Simmons ............................. | 379/355 |
| 4,649,385 | 3/1987 | Aires et al. . | |
| 4,652,700 | 3/1987 | Matthews et al. . | |
| 4,658,416 | 4/1987 | Tanaka . | |
| 4,661,972 | 4/1987 | Kai . | |
| 4,670,628 | 6/1987 | Boratagis et al. . | |
| 4,672,660 | 6/1987 | Curtin . | |
| 4,674,115 | 6/1987 | Kaleita et al. . | |
| 4,677,654 | 6/1987 | Lagin et al. . | |
| 4,677,663 | 6/1987 | Szlam . | |
| 4,680,785 | 7/1987 | Akiyama . | |
| 4,696,028 | 9/1987 | Morganstein et al. ............... | 379/212 |
| 4,707,592 | 11/1987 | Ware . | |
| 4,713,808 * | 12/1987 | Gaskill et al. ......................... | 370/94 |
| 4,736,405 | 4/1988 | Akiyama . | |
| 4,737,976 | 4/1988 | Borth et al. . | |
| 4,740,788 | 4/1988 | Konneker . | |
| 4,747,122 | 5/1988 | Bhagat et al. . | |
| 4,747,124 | 5/1988 | Ladd . | |
| 4,748,655 * | 5/1988 | Thrower et al. ..................... | 379/60 |
| 4,752,951 | 6/1988 | Konneker . | |
| 4,757,267 | 7/1988 | Riskin . | |
| 4,757,525 | 7/1988 | Matthews et al. . | |
| 4,761,807 | 8/1988 | Matthews et al. . | |
| 4,775,999 * | 10/1988 | Williams ............................... | 379/59 |
| 4,783,796 | 11/1988 | Ladd . | |
| 4,788,718 | 11/1988 | McNabb et al. . | |
| 4,802,209 * | 1/1989 | Hagsegawa ......................... | 379/217 |
| 4,809,321 | 2/1989 | Morganstein et al. . | |
| 4,814,763 | 3/1989 | Nelson et al. . | |
| 4,821,308 | 4/1989 | Hashimoto . | |
| 4,823,123 | 4/1989 | Siwiak . | |
| 4,825,193 | 4/1989 | Siwiak et al. . | |
| 4,829,554 * | 5/1989 | Barnes et al. ......................... | 379/58 |
| 4,845,739 | 7/1989 | Katz . | |
| 4,847,890 | 7/1989 | Solomon et al. . | |
| 4,856,047 | 8/1989 | Saunders ............................... | 379/57 |
| 4,860,347 | 8/1989 | Costello . | |
| 4,868,560 | 9/1989 | Oliwa et al. . | |
| 4,875,038 | 10/1989 | Siwiak et al. . | |
| 4,878,239 | 10/1989 | Solomon et al. . | |
| 4,878,240 | 10/1989 | Lin et al. . | |
| 4,879,743 | 11/1989 | Burke et al. . | |
| 4,881,271 | 11/1989 | Yamauchi et al. . | |
| 4,882,579 | 11/1989 | Siwiak et al. . | |
| 4,890,317 | 12/1989 | Hird et al. . | |
| 4,893,329 | 1/1990 | O'Brian . | |
| 4,893,335 | 1/1990 | Fuller . | |
| 4,896,346 | 1/1990 | Belfield et al. . | |
| 4,899,358 | 2/1990 | Blakley . | |
| 4,899,373 | 2/1990 | Lee et al. . | |
| 4,918,725 | 4/1990 | Takahashi . | |
| 4,920,562 | 4/1990 | Hird et al. . | |

| | | | |
|---|---|---|---|
| 4,922,490 | 5/1990 | Blakley | 379/88 |
| 4,926,462 | 5/1990 | Ladd et al. | |
| 4,932,042 | 6/1990 | Baral et al. | |
| 4,933,965 | 6/1990 | Hird et al. | |
| 4,935,956 | 6/1990 | Hellwarth et al. | |
| 4,935,958 | 6/1990 | Morganstein et al. | 379/201 |
| 4,940,963 | 7/1990 | Gutman et al. | |
| 4,941,203 | 7/1990 | Patsiokas et al. | |
| 4,942,598 | 7/1990 | Davis | |
| 4,947,421 | 8/1990 | Toy et al. | |
| 4,953,198 | 8/1990 | Daly et al. | |
| 4,955,047 | 9/1990 | Morganstein et al. | |
| 4,989,230 * | 1/1991 | Gillig et al. | 379/59 |
| 5,007,076 | 4/1991 | Blakley | 379/67 |
| 5,020,095 | 5/1991 | Morganstein et al. | |
| 5,023,868 | 6/1991 | Davidson et al. | |
| 5,027,384 | 6/1991 | Morganstein | |
| 5,029,196 | 7/1991 | Morganstein | 379/211 |
| 5,033,079 | 7/1991 | Catron et al. | |
| 5,036,535 | 7/1991 | Gechter et al. | 379/201 |
| 5,042,064 * | 8/1991 | Chung et al. | 379/113 |
| 5,058,152 | 10/1991 | Solomon et al. | |
| 5,060,255 | 10/1991 | Brown | |
| 5,063,588 | 11/1991 | Patsiokas et al. | |
| 5,077,789 | 12/1991 | Clark, Jr. et al. | |
| 5,090,051 * | 2/1992 | Muppidi et al. | 379/61 |
| 5,109,405 | 4/1992 | Morganstein | |
| 5,128,981 | 7/1992 | Tsukamoto et al. | 379/59 |
| 5,151,929 | 9/1992 | Wolf | 379/57 |
| 5,161,181 | 11/1992 | Zwick | 379/88 |
| 5,164,985 | 11/1992 | Nysen et al. | |
| 5,175,758 * | 12/1992 | Levanto et al. | 379/57 |
| 5,177,780 * | 1/1993 | Kasper et al. | 379/59 |
| 5,193,110 | 3/1993 | Jones et al. | |
| 5,199,062 | 3/1993 | Von Meister et al. | |
| 5,206,900 | 4/1993 | Callele | |
| 5,206,901 | 4/1993 | Harlow et al. | 379/211 |
| 5,222,120 | 6/1993 | McLeod et al. | |
| 5,222,125 | 6/1993 | Creswall et al. | |
| 5,224,156 | 6/1993 | Fuller et al. | |
| 5,235,634 * | 8/1993 | Oliver | 379/106 |
| 5,260,986 | 11/1993 | Pershan | |
| 5,276,678 | 1/1994 | Hendrickson et al. | |
| 5,276,731 | 1/1994 | Arbel et al. | |
| 5,307,399 * | 4/1994 | Dai et al. | 379/57 |
| 5,307,400 | 4/1994 | Sawyer et al. | |
| 5,309,512 | 5/1994 | Blackmon et al. | 379/210 |
| 5,311,570 | 5/1994 | Grimes et al. | 455/31.3 |
| 5,315,636 | 5/1994 | Patel | |
| 5,315,637 | 5/1994 | Breeden et al. | |
| 5,327,480 | 7/1994 | Breeden et al. | |
| 5,327,486 | 7/1994 | Wolff et al. | 379/96 |
| 5,327,489 | 7/1994 | Anderson et al. | |
| 5,333,182 | 7/1994 | Aoki | |
| 5,353,331 | 10/1994 | Emery et al. | |
| 5,354,633 | 10/1994 | Dennison et al. | |
| 5,375,161 | 12/1994 | Fuller et al. | |
| 5,384,831 | 1/1995 | Creswell et al. | |
| 5,388,149 | 2/1995 | Lynn et al. | |
| 5,394,463 | 2/1995 | Fischell et al. | |
| 5,408,519 | 4/1995 | Pierce et al. | |
| 5,410,541 | 4/1995 | Hotto | |
| 5,450,479 | 9/1995 | Alesio et al. | |
| 5,469,496 | 11/1995 | Emery et al. | |
| 5,471,519 | 11/1995 | Howe et al. | 379/67 |
| 5,515,426 | 5/1996 | Yacenda et al. | |
| 5,525,991 | 6/1996 | Nagura et al. | |
| 5,557,658 | 9/1996 | Gregorek et al. | 379/67.1 |
| 5,579,535 * | 11/1996 | Orlen et al. | |
| 5,598,458 * | 1/1997 | Bales et al. | 379/58 |
| 5,608,782 * | 3/1997 | Carlsen et al. | 379/63 |
| 5,610,970 | 3/1997 | Fuller et al. | |
| 5,661,790 | 8/1997 | Hsu | |
| 5,673,299 | 9/1997 | Fuller et al. | 379/57 |
| 5,694,453 | 12/1997 | Fuller, et al. | |
| 5,703,937 | 12/1997 | Saltzman | |
| 5,742,905 | 4/1998 | Pepe et al. | 455/461 |
| 5,751,760 | 5/1998 | Fuller et al. | |
| 5,752,191 | 5/1998 | Fuller et al. | |
| 5,825,867 | 10/1998 | Epler et al. | 379/215 |
| 5,838,779 | 11/1998 | Fuller et al. | 379/211 |
| 5,841,837 | 11/1998 | Fuller et al. | 379/57 |
| 5,842,112 | 11/1998 | Fuller et al. | 455/31.2 |
| 5,924,016 | 7/1999 | Fuller et al. | 455/31.1 |

FOREIGN PATENT DOCUMENTS

| | | |
|---|---|---|
| 04119555 * | 12/1992 | (DE) . |
| 0046623 | 3/1982 | (EP) . |
| 0152908 | 8/1985 | (EP) . |
| 0216381 | 4/1987 | (EP) . |
| 0216515 | 4/1987 | (EP) . |
| 0330441 | 8/1989 | (EP) . |
| 0 454 647 A2 | 10/1991 | (EP) . |
| 0 462 727 A2 | 12/1991 | (EP) . |
| 0 546 572 A2 | 6/1993 | (EP) . |
| 0 556 575 A1 | 8/1993 | (EP) . |
| 2541020 | 2/1983 | (FR) . |
| 498520 | 1/1939 | (GB) . |
| 2173071 | 6/1988 | (GB) . |
| 2198910 | 6/1998 | (GB) . |
| 25 42 834 | 11/1976 | (GE) . |
| 25 22 758 | 12/1976 | (GE) . |
| 56-39786 | of 1981 | (JP) . |
| 59-95760 | 6/1984 | (JP) . |
| 109363 | 6/1985 | (JP) . |
| 61-80937 | 4/1986 | (JP) . |
| 62-118670 | 5/1987 | (JP) . |
| 87-219740 | 9/1987 | (JP) . |
| 62-235853 | 10/1987 | (JP) . |
| 152258 | 6/1988 | (JP) . |
| 22191 | of 1989 | (JP) . |
| 8304451 | 12/1983 | (WO) . |
| 93/01677 | 1/1993 | (WO) . |
| 96/09731 | 3/1996 | (WO) . |

OTHER PUBLICATIONS (Fujitsu Ltd.) Patent Abstracts of Japan, vol. 5, No. 70, 1981.
(Fujitsu KK) Patent Abstracts of Japan, vol. 7, No. 288, 1983.
IBM Technical Disclosure Bulletin vol. 26, No. 5, D. Zeheb "Secretarial Branch Exchange", 1983.
Applied Voice Technology product reference guide for "Call Xpress 200 and 400 Series", Feb. 1989.
Applied Voice Technology user guide for "Call Xpress", Nov. 1989.
"SR 19000 PBX Digital Private Branch Exchange Product Reference Guide"; Solid State Systems, Inc., Nov. 1987.
Product Reference Guide: "Search Report 1000 PBX Digitial Private Branch Exchange", Solid State Systems Inc., Nov. 1987.
Chungming An & Alison Mearns. Direct Dialing of Credit Card Calls, Conference: 1981 International Conference on Communications, Denver Co (Jun. 1981).
Perkins, et al. *Consumer Reports 1992 Travel Buying Guide*—"How to Get Big Discounts on Airfares, Hotels, Car Rentals, and More", Consumer Reports, NY 1992.
CCITT Paper. "Universal Personal Telecommunication Definition and Attributes" Oct. 1989.
R.M. Fuller Co. Telexpand System 1. "Advanced Operations Manual"Appen. J. 1985.
Excerpt from Aspect Call Center "Workstation User's Guide" Release 1.0 pp. 110–119, 1987, with excerpts from a Release 2.0 of "Workstation User's Guide" pp. 78, 89–91 May 1988.

* cited by examiner

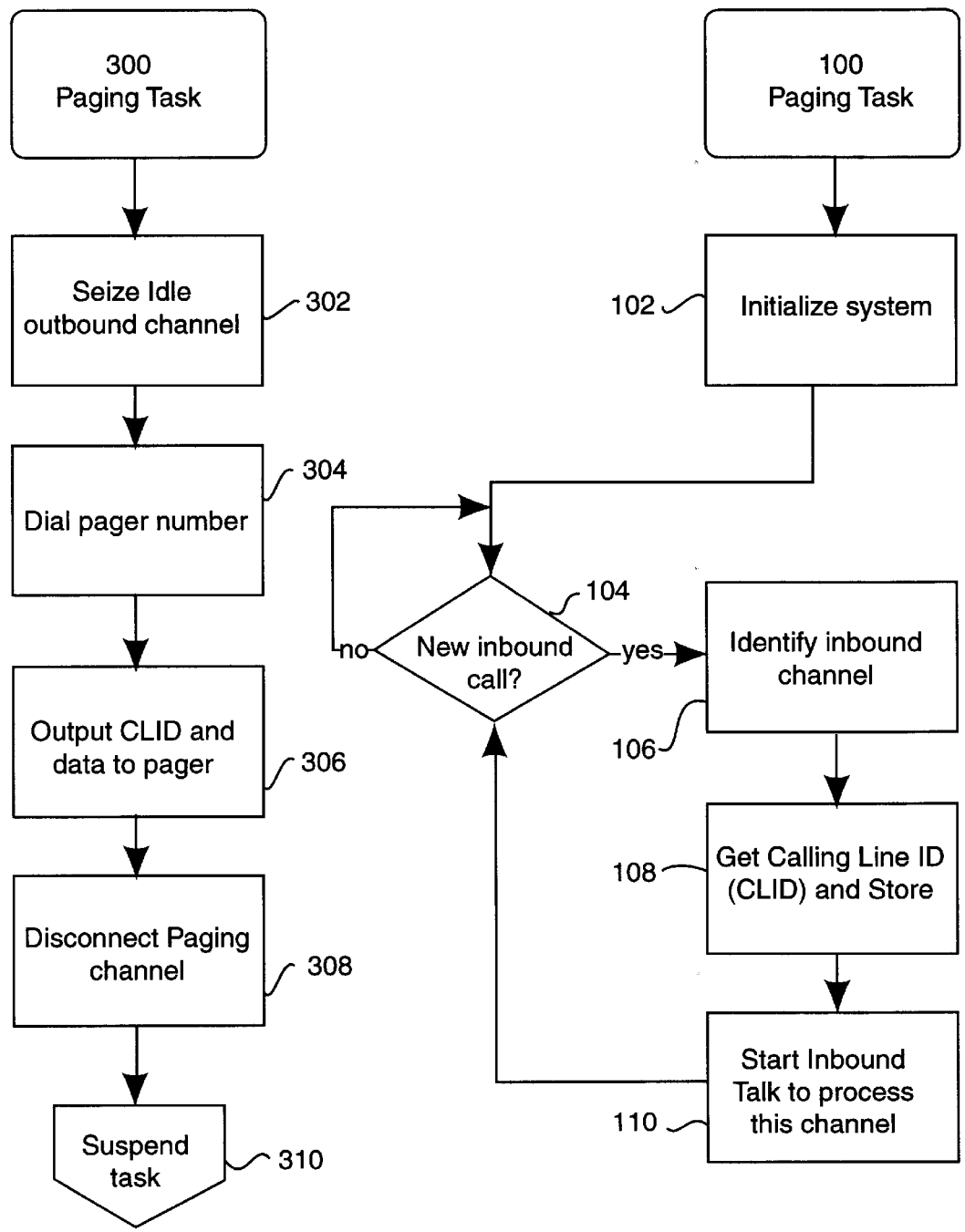

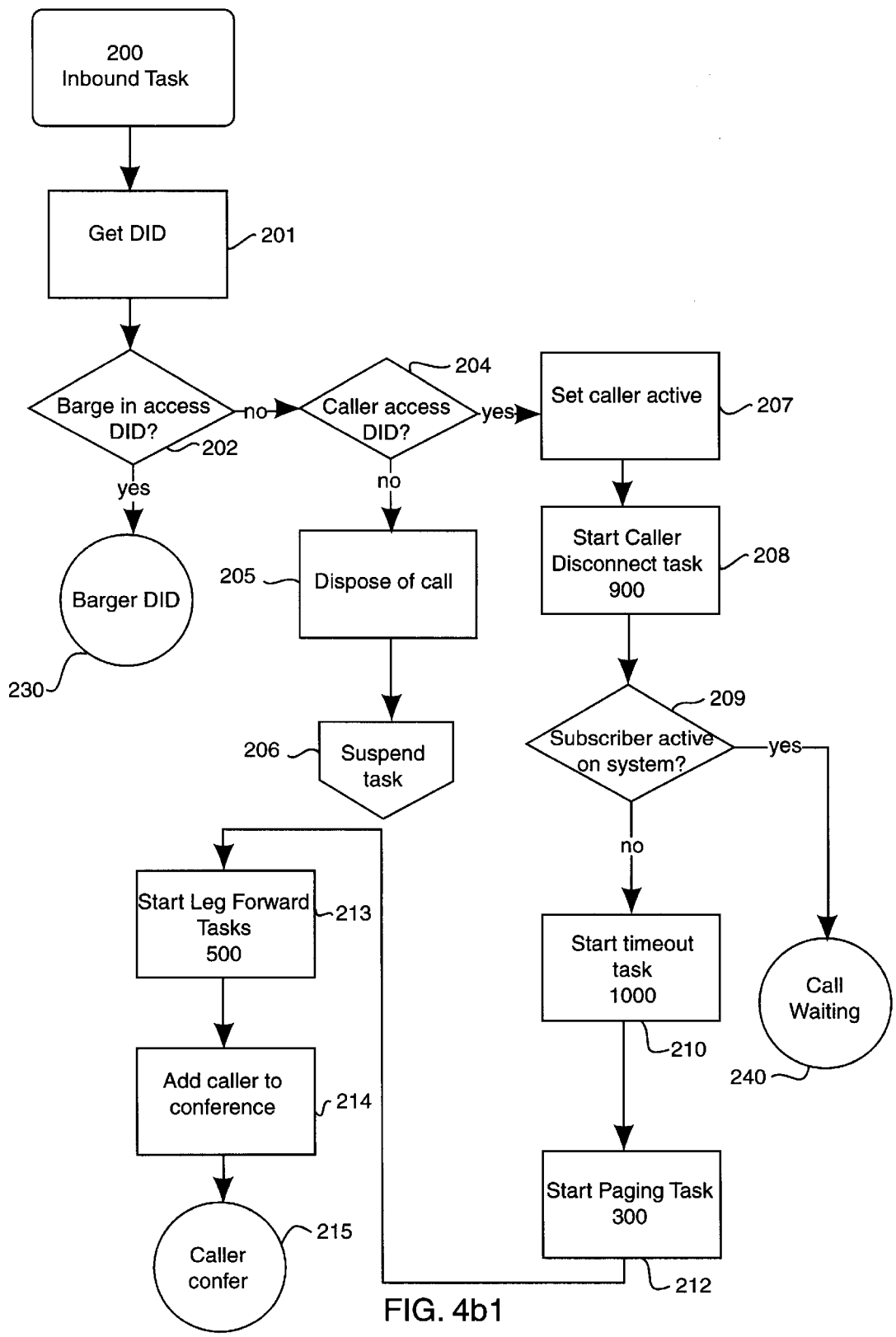
FIG. 4b1

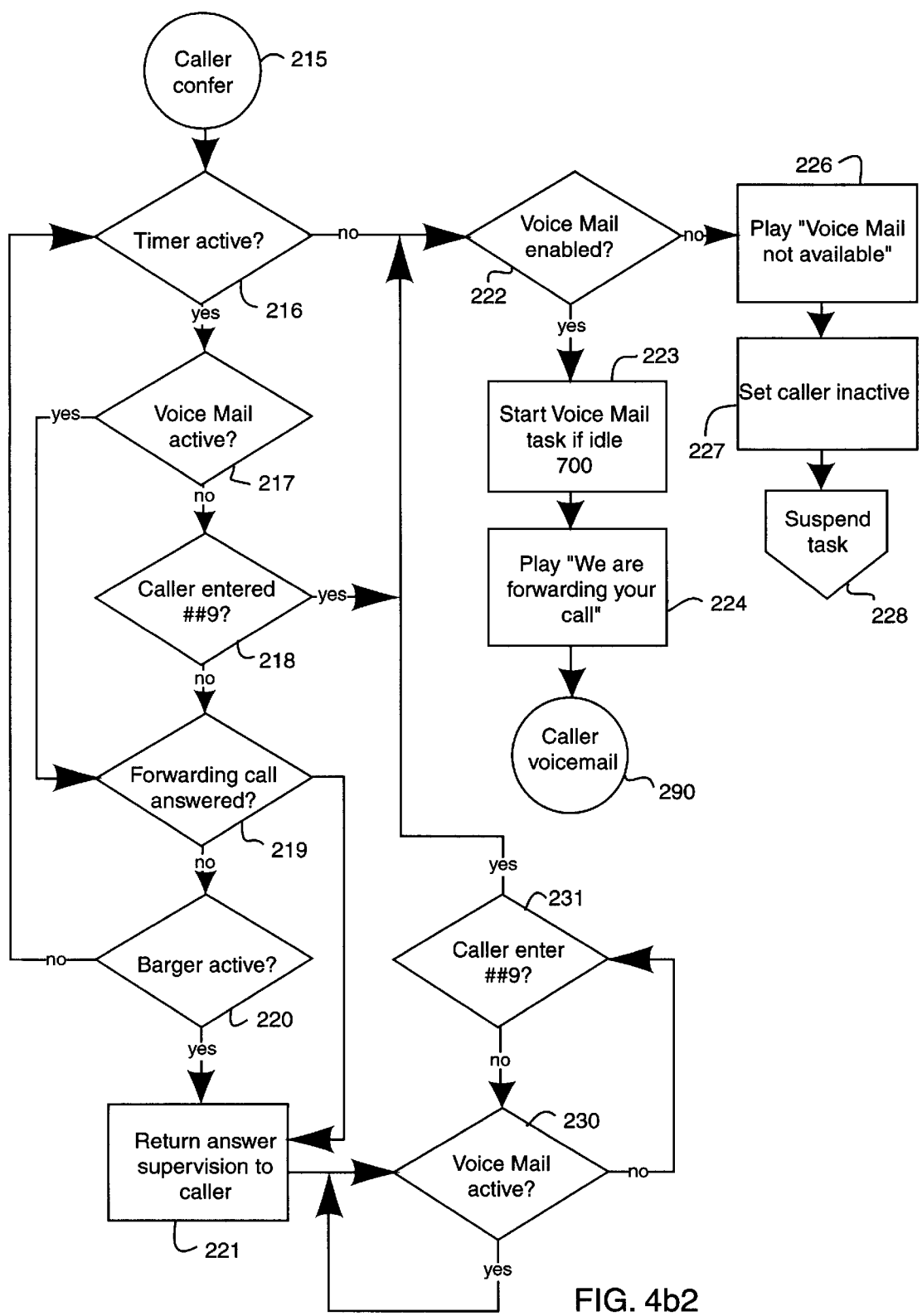
FIG. 4b2

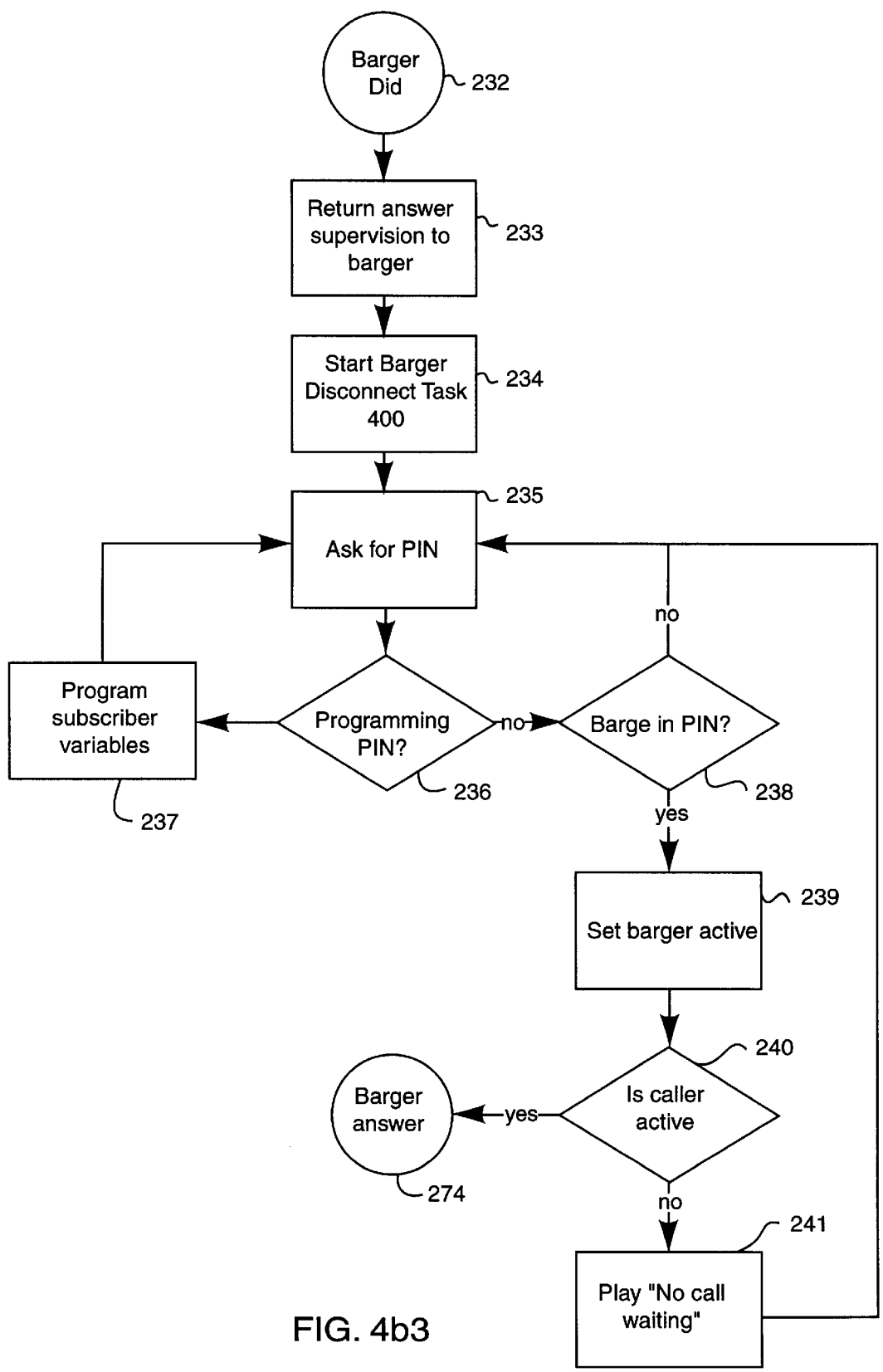
FIG. 4b3

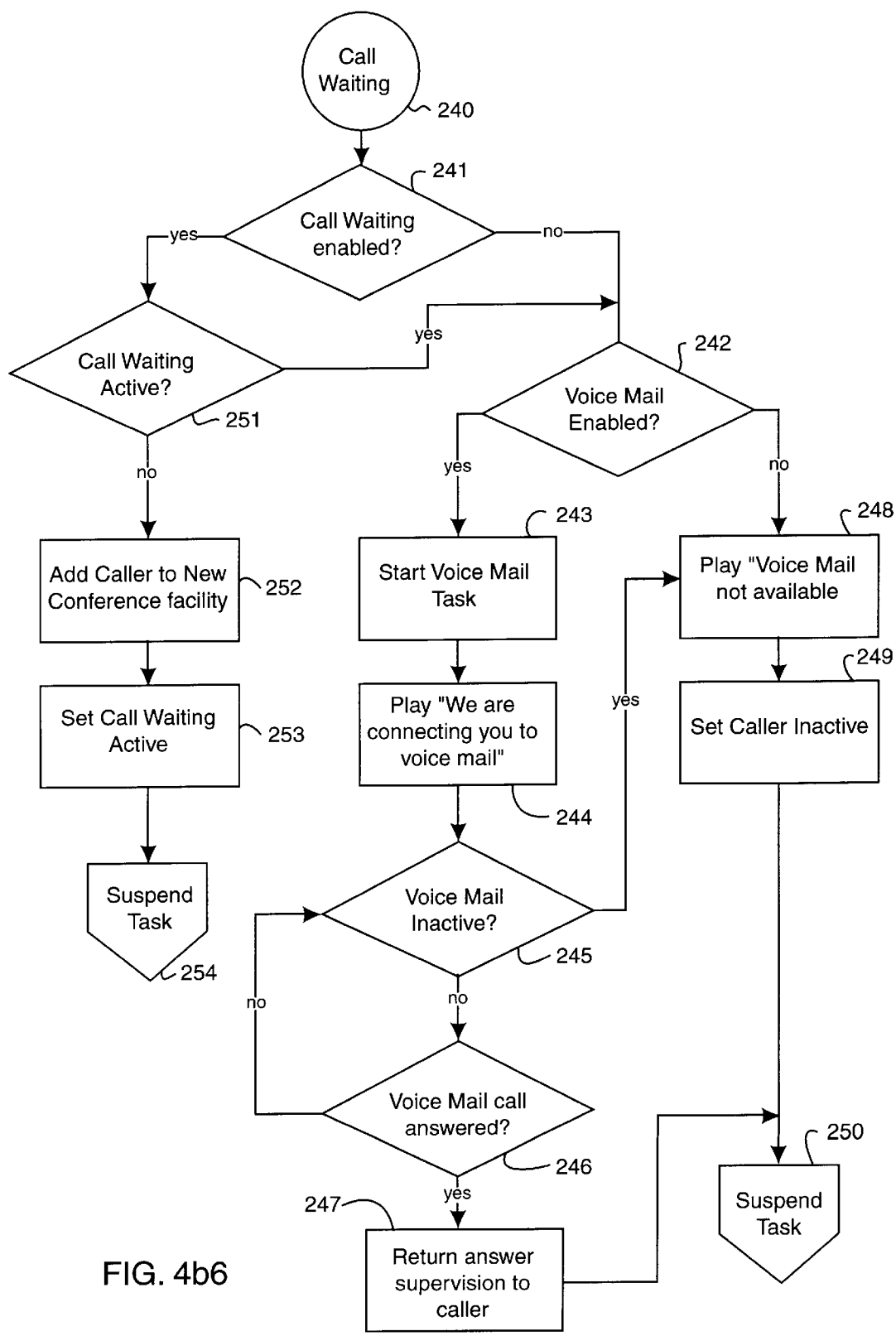
FIG. 4b6

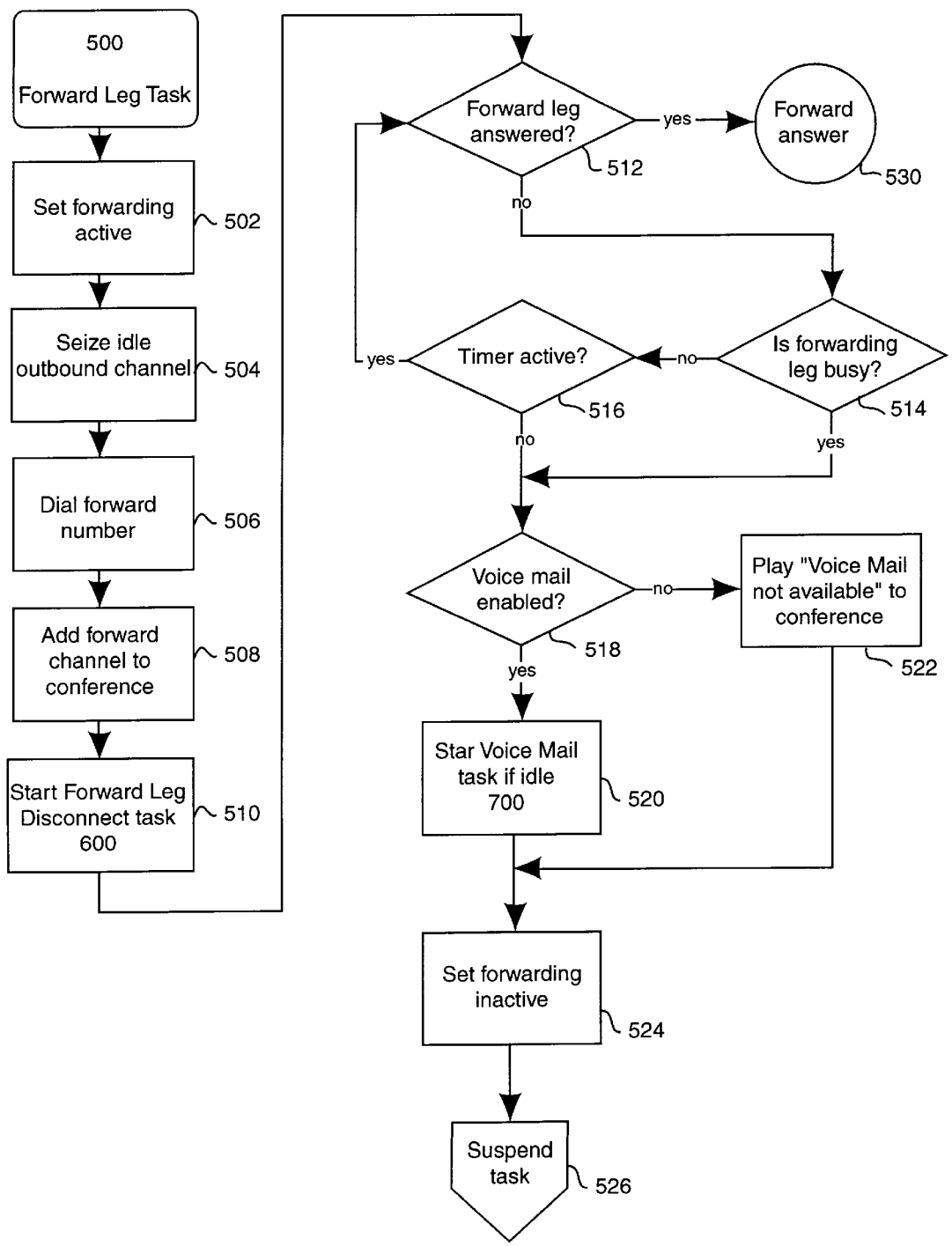
FIG. 4e1

FIG. 4e2

COMPUTER-CONTROLLED PAGING AND TELEPHONE COMMUNICATION SYSTEM AND METHOD

CROSS REFERENCE TO RELATED APPLICATIONS

This application is a Continuation-in-Part of U.S. patent application No. 08/210,347 filed Mar. 18, 1994, (now U.S. Pat. No. 5,825,867, Oct. 20, 1998) which is a Continuation-in-Part of U.S. patent application Ser. No. 07/480,242 filed Feb. 15, 1990, (now U.S. Pat. No. 5,375,161, Dec. 20, 1994) which is a Continuation-in-Part of U.S. patent application No. 07/439,601 filed Nov. 21, 1989, now abandoned which is a Continuation-in-Part of U.S. patent application Ser. No. 06/841,931 filed Mar. 20, 1986 (now U.S. Pat. No. 4,893,335, issued Jan. 9, 1990), which is a Continuation-in-Part of U.S. patent application Ser. No. 06/650,821 filed Sep. 14, 1984 (now abandoned). Each one of the aforementioned U.S. patent applications is hereby incorporated herein by reference.

TECHNICAL FIELD

The present invention relates to a computer-controlled signaling and telephone communication system and method for notifying a subscriber of a telephone call placed by a caller to the subscriber.

BACKGROUND OF THE INVENTION

Telephone systems are well known and, indeed, a number of techniques are known in the prior art to facilitate connecting a caller (i.e. the party initially placing the telephone call) with a telephone subscriber (i.e. the party whom the caller is trying to contact by telephone). Of course, a very well known way to accomplish this end is to have a telephone ring at a subscriber's presumed location.

It is well known, however, that subscribers move about during the day, and therefore, other techniques have been employed to try to place callers into telephone communication with subscribers. These other techniques include paging systems and voice mail systems. However, both paging systems and voice mail systems typically suffer a drawback in that the subscriber must receive or pick up a message either from the paging system or from a voice mail system, or some combination of the two, and thereafter, place a telephone call to the caller in order to be placed into direct telephone communication with the caller.

A problem with this approach is that it is not particularly efficient. By the time the subscriber receives the page and responds to it, the caller may have left the place from which they were telephoning or may be at an unknown location, in which case, the subscriber is frustrated in attempting to make telephone contact with the caller.

One solution to this problem, as suggested in the prior art, is to provide a "meet-me" service in which a caller is placed on hold at the same time the subscriber is paged to a telephone. The subscriber then telephones a telephone system and the system, upon recognizing the call from the subscriber, connects the subscriber with the original caller who has been placed on hold. This "meet-me" system is described in U.S. Pat. No. 5,151,929. When the subscriber is connected to the caller this action is sometimes known as "barging in".

This prior art "meet-me" system, while improving telephone communications, still suffers certain drawbacks. For example, in a modern office, people do not necessarily stay put at their desk. They need to interface with other people in their office, and therefore, discussions may be held in offices other than their own or in conference rooms and; of course, they may leave the office to go to lunch, the bathroom or run errands. Some subscribers have a tendency to use the prior art "meet-me" system a great deal of time. While it is possible with current telephone systems to switch the "meet-me" service on and off, it does require that a subscriber input certain codes at a telephone to switch off the "meet-me" service and then key in certain codes at a telephone to turn the "meet-men" service back on. If the subscriber uses the "meet-me" system in the manner described, they are supposed to telephone the system to turn off the meet me mode whenever they arrive at the office and turn it back on whenever they leave the office. That might work well in theory, but it does not work well in practice because people forget to switch their telephone service, either when leaving the office or returning to the office; or alternatively, they will leave their telephones in the "meet-me" mode 100% of the time.

A problem which arises when a subscriber uses the "meet-me" mode is that it takes a relatively long time for a caller to make telephone contact with the subscriber, since even if they are sitting at their desk, the "meet-me" system first pages them, requiring them to pick up their telephone and input certain numbers in order to gain access to a telephone switch where they eventually meet their caller. A telephone call which might otherwise take only 15 or 20 seconds to complete, can take three or four times as long when the subscriber leaves their telephone in the "meet-me" mode.

It is, therefore, an object of the present invention to provide and improve this "meet-me" service. With the improved "meet-me" service described herein, a telephone subscriber may keep his or her telephone in a "meet-me" mode most of the time, but the system, in addition to paging the subscriber, also places a telephone call from the caller to one or more expected locations of the subscriber.

BRIEF DESCRIPTION OF THE DRAWINGS

FIGS. 4a–4j provide a detailed flow diagram of a preferred embodiment of the invention—the flow diagram includes a Main Task in FIG. 4a, an Inbound Task in FIGS. 4b1–4b6, a Paging Task in FIG. 4c, a Barger Disconnect Task in FIG. 4d, a Forward Leg Task in FIGS. 4e1 and 4e2, a Forward Leg Disconnect Task in FIG. 4f, a Voive Mail Task in FIG. 4g, a Voice Mail Disconnect Task in FIG. 4h, a Caller Disconnect Task in FIG. 4i and a Timer Task in FIG. 4j;

BRIEF DESCRIPTION OF THE APPENDICES

Appendix I is a source code listing of the Main Program written in VOS (Voice Operating System);

Appendix II is a source code listing of an Inbound Task used by the Main Program;

Appendix III is a source code listing of an Forward Task used by the Main Program;

Appendix IV is a source code listing of a Page Task used by the Main Program;

Appendix V is a source code listing of an Voice Mail Task used by the Main Program;

DETAILED DESCRIPTION

Figure 1:
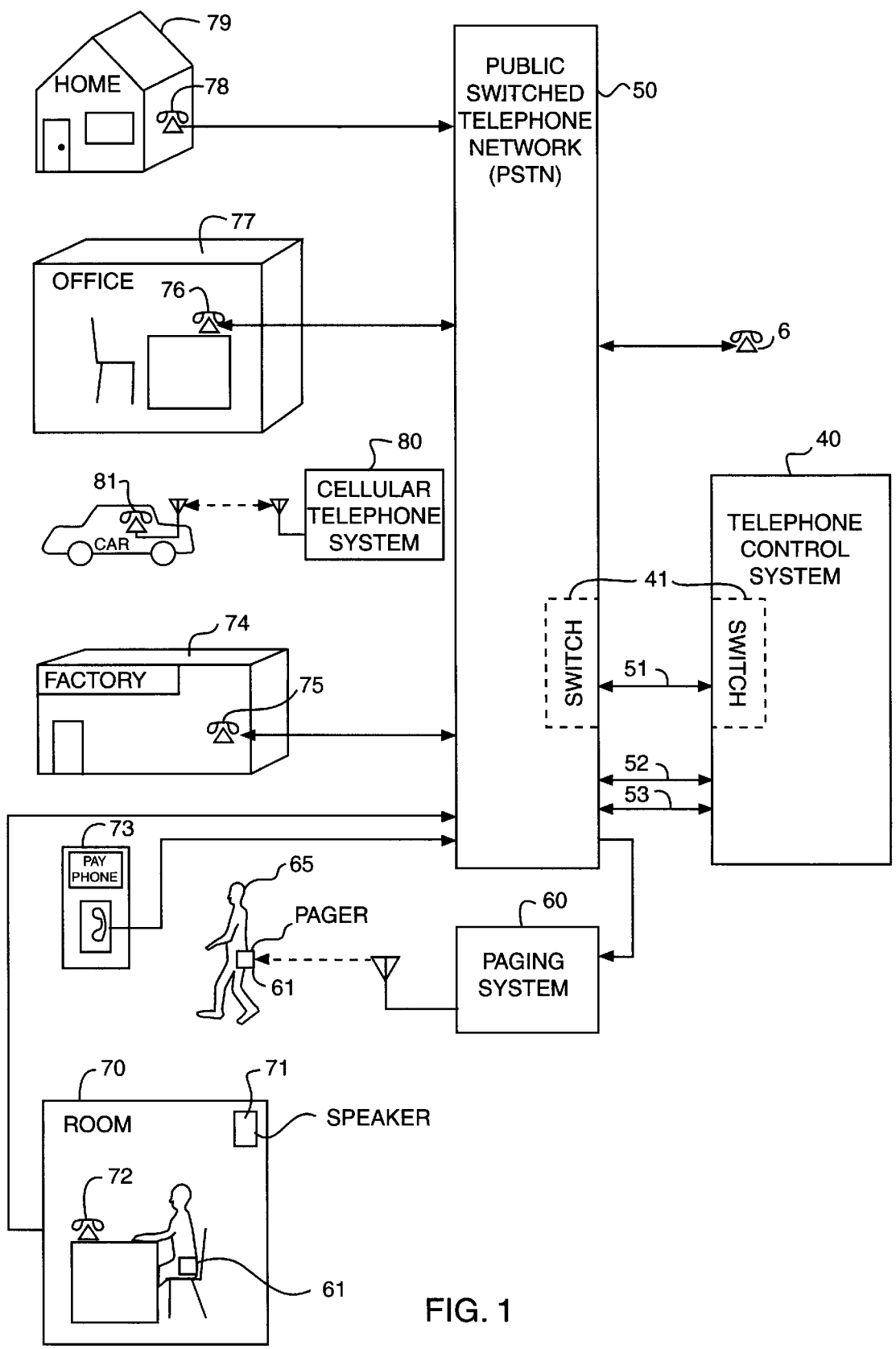
FIG. 1 is a schematic diagram of the system of the present invention.

FIG. 1 is a schematic diagram of one embodiment of a telephone control system 40 of the present invention. In this embodiment, the apparatus and method of the invention control a switch 41 which may be located, for example, in the central office of a telephone company. Alternatively, and preferably, a controlled switch 41 is also included with the apparatus of the present invention, which, in turn, may be located either on the premises of the telephone company switch or elsewhere, including the premises of a business which make use of the system. In another embodiment the invention is embodied in a telephone control system 40 which may be placed upstream of a private branch exchange (PBX) having direct inward dialing (DID) capabilities.

Before describing the preferred embodiment in detail, a general overview of how the invention may be practiced is first described with reference to FIG. 1 and the flow diagram of FIG. 2. This flow diagram is straight forward and is intended to give an overview of how the system handles telephone calls. A more robust flow diagram is set forth in FIGS. 4a–4j which shows how the preferred embodiment of the system would function in a multitasking environment.

Figure 2:
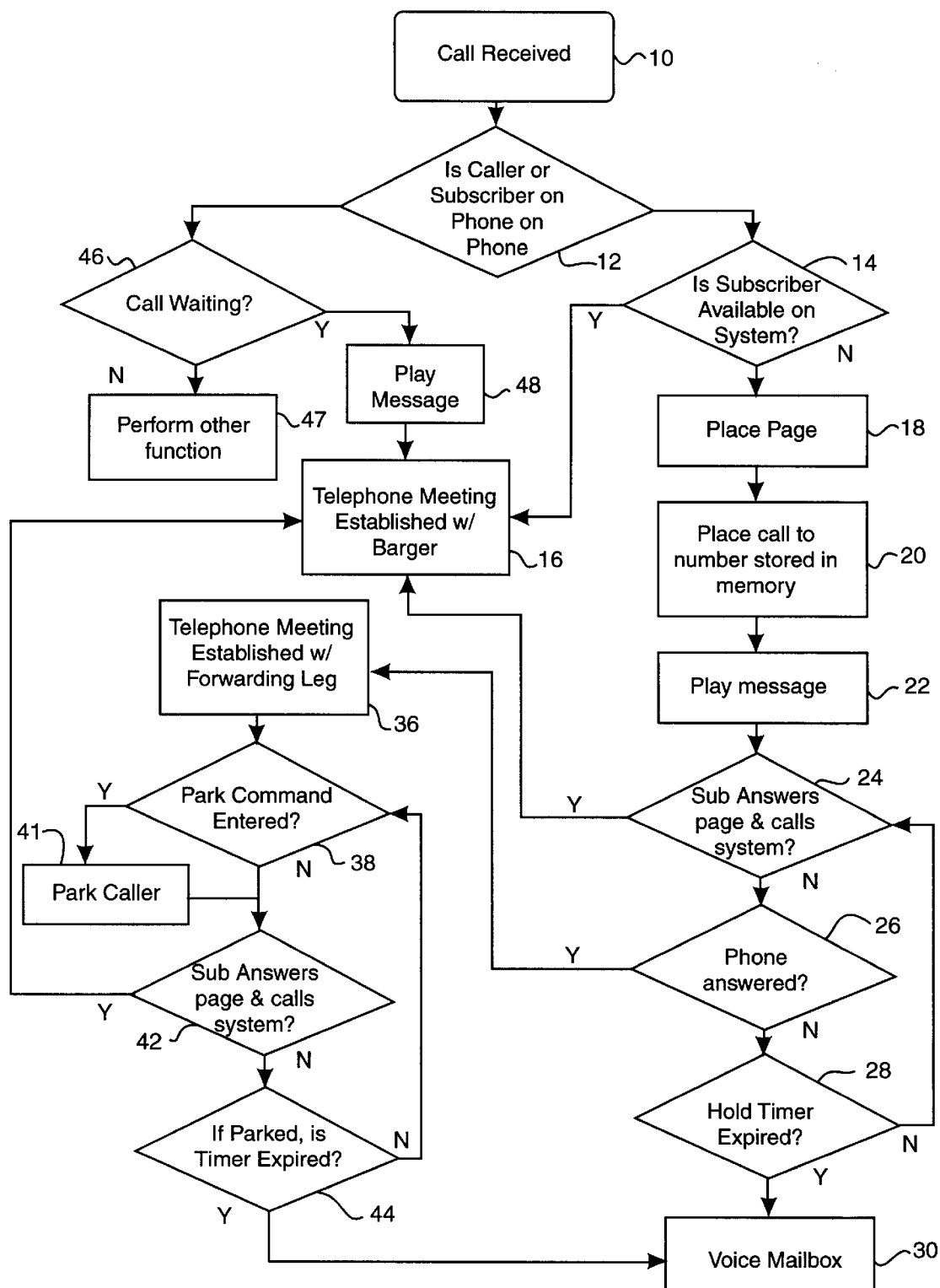
FIG. 2 is a flow diagram showing the processing capabilities of the call processing facility of the system of FIG. 1.

Referring to FIG. 2, a call is received at block 10 and a decision is made at step 12 as to whether or not the person placing the call is a subscriber of the system or is a caller who is trying to reach a subscriber 65 (FIG. 1). The location of the subscriber may be unknown. The subscriber may be at home 79, at the office 77, in their automobile or elsewhere. The telephone control system will attempt to use the resources to place the subscriber in telephone contact with a caller located at a phone 6.

Caller and subscribers can be differentiated in a number of ways. Thus the decision at step 12 can be made by various means, including (i) examining the Calling Line I.D. (CLID) of the party placing the call to determine if the caller is a known subscriber and/or (ii) examining the Direct Inward Dial (DID) digits received from the Public Switched Telephone Network (PSTN) 50 (this embodiment assumes that the subscriber has one telephone number which he or she uses to contact the system and a different telephone number which his or her callers use to contact the subscriber) and/or (iii) whether a special code (i.e. a personal identification code or PIN) is input by the person placing and/or receiving the call to identify themselves as a subscriber. Since the CLID is not always available and since forcing the subscriber to use a PIN makes the marketing of a telephone service more difficult, the currently preferred technique is (ii) one telephone number can be dedicated to each subscriber for the subscriber to use when calling the system to pick up messages or, in the context of the present invention, to meet a calling party who had called the system trying to contact them, and a second telephone number can be dedicated to each subscriber for callers to use when calling the subscriber via system. In any event, it is contemplated that incoming calls can be differentiated between subscribers of the system and callers (who are trying to contact subscribers).

Assuming that a caller is on the line trying to reach a subscriber, a test is preferably made at step 14 to determine whether or not the subscriber is already available on the system. Whether or not this particular test is made at this stage, depends in part, on whether or not the particular hardware which is utilized will support the making of such a test and whether the additional complexity of including this test is deemed to be worthwhile. It is believed that this test should preferably be performed. If the subscriber is already available on the system at the time the caller calls, the processing branch to block 16 where a telephone connection is established between the caller and the subscriber. The subscriber may already be on the system if, for example, the system includes a voice mail system and therefore the subscriber may already be on the system at the time the caller calls for the purpose of picking up his or her voice mail messages. Alternatively the subscriber may be engaged in a conversation with another caller. In that case, when the new caller reaches the system, call waiting treatment is preferably applied. At block 16, when a telephone meeting is established, that means that a connection is made between the subscriber who has dialed the system on one line with a caller who has also dialed the system on a different telephone line.

If the subscriber is not available at step 14, or if that test is not made, the call processing falls through to block 18 where a page is placed to the subscriber. The page may be via a conventional radio-communications paging system 60 to a device 61 which signals the subscriber by making beeping sounds, or vibrating, or otherwise signaling the subscriber that they are being paged. Alternatively, the page may be by other means, including a computer generated audible voice page delivered in a suite of offices or rooms 70 by means of speakers 71 advising a party that they have a call. Such a page can be delivered directly to speakers built into many telephones and a subscriber, after being so paged, can go directly to the nearest telephone, enter a FIN code and be connected to the calling party. Some means of signaling the subscriber that they have a call is provided, so that they know to access the system and make a connection with the caller.

More or less simultaneously, the system also places a call to a telephone where the subscriber 65 is expected to be located, for example, to phone 76 at office 77 or a phone 72 in a room 70 in a building. This call may be placed via a PBX to a telephone in the subscriber's office or may be placed via the PSTN 50 directly to a telephone 76 on the subscriber's desk, or to another telephone where the subscriber is expected to be located, for example, phone 81 in the subscriber's automobile, phone 78 at the subscriber's home 79, phone 75 at factory 74, or to a phone on their person, or wherever the system expects to locate the subscriber. The telephone number of the subscriber's expected location(s) is (are) stored in a memory in the control system 40 and indeed, may be based upon a schedule which tracks the normal movements of the subscriber throughout the day. The schedule may include a "Do Not Disturb" mode in which they would not be paged nor would the system try to contact them directly, but rather, the caller would be connected directly to a voice mail box 30 of the subscriber. As will be discussed with reference to the preferred embodiment, the system can also make more than one call seeking the subscriber. Such calls can be made simultaneously or sequentially. In the preferred embodiment, the voice mail system is available at a telephone number which is contacted sequentially, that is, after the usual forward leg call(s) are made. Instead of contacting a voice mail system, the telephone number of the subscriber's secretary, for example, may be stored in the system so that then the system fails in making a connection with the subscriber within a predetermined time period, the inbound call then would be directed to the subscriber's secretary (for example) instead of to voice mail.

In addition to placing the page and placing the telephone call, the caller is preferably informed that normal call processing is occurring. This may be done by (i) allowing the caller to listen to the sounds generated by the PSTN (or local PBX) while the call is being placed to where the subscriber is expected to be located, or (ii) simulating telephone ringing sounds, or (iii) generating a voice indicating to the caller that the caller has reached the telephone line of the subscriber and the subscriber is being paged to a telephone, or (iv) playing music, or any combination of the forgoing, starting at step 22. Typically a timer would also be set for the subscriber to either answer their phone or to answer their page and telephone the system.

A test is made at step 24 to determine whether or not the subscriber has answered the page and telephoned the system. The subscriber can use any telephone interconnected to the system to respond to the page, including a pay telephone 72 on the street. If the subscriber has answered the page and telephoned the system, a branch is made to block 16 for which the processing has been previously described. Otherwise, the processing falls through to another test at step 26 to determine whether or not the telephone number, which was called at step 20, has been answered. If desired, a message may be played for the answeree, advising them that the subscriber has an incoming call, and thus giving the answeree the opportunity to receive the call or to reject the call. Preferably the processing falls through to step 36. The two steps discussed above, namely advising the answeree of the call and allowing them to reject it, may not be embodied at all or only partially or may be disabled by suitable programming so that these additional steps might be utilized in some situations and not in others. For example, if the call placed at step 20 is directed to the subscriber's telephone at their desk, such additional steps may not be warranted. On the other hand, when the telephone number which is called at step 20 is a telephone number which is not necessarily primarily and exclusively associated with the subscriber, such as a home telephone number, such additional steps might be included so that the answeree is advised that an incoming call is for the subscriber, giving them the opportunity to accept or reject the call. The timer examines how long the caller has been waiting for the subscriber to either answer a phone or to answer the page, and if the subscriber does not respond within a reasonable period of time, the processing falls through at step 28 so that the caller is then conveyed to a voice mailbox, at block 30, where they would be invited to leave a message for the subscriber.

Turning now to Box 36, a phone call has been placed at step 20, and if the telephone has been answered, the caller is connected to the person who answered the telephone at step 36. This is preferably accomplished by a direct connection in the system. Alternatively, conferencing facilities of the PSTN 50 may be used.

The person answering the telephone can park the call at step 38. This is useful because the person answering the telephone may tell the caller that the subscriber will be with them in a few moments and then place the call on park at step 41. As will be seen, in the embodiment disclosed with reference to FIGS. 4a–4j, the call can be parked merely by placing the answered phone on hook. At step 42, a test is made to determine if the subscriber has answered the page by phoning into the system. If so, a branch is made to block 16 where the subscriber is placed into direct telephone communication with the caller. The party on the forwarded leg is preferably also allowed into the conference and the subscriber is preferably provided with a mechanism to disengage the party on the forwarded leg. If the subscriber has not yet telephoned the system, the processing falls through to step 44 where, if the call has been parked, a determination is made to see if a park timer has expired. If the caller has been parked for more than a predetermined amount of time, as indicated by the timer, the processing will fall through step 44, and the caller is directed to the subscriber's voice mail at block 30 where the caller can leave a voice mail message for the subscriber.

When the subscriber answers the page by telephoning the system, and the call made at step 20 has also been answered, then a three way conference ensues. An appropriate warning tone or message can be played so that the persons in telephone communication realize that the subscriber is barging into the telephone call. Preferably, the subscriber is provided with a means of disconnecting the party who answered the call on the forward leg to ensure privacy.

It is to be noted that a test is made at both steps 24 and 42 as to whether or not the subscriber has answered the page and telephoned the system. Preferably, that testing would occur throughout the processing described above, and not simply at the places indicated. A more robust version of this system will be described with reference to FIGS. 4a–4j, which employs multitasking so that multiple processes can be performed simultaneously.

Turning now to an incoming call being detected from a subscriber, a test is made at step 46 to determine whether or not a call is waiting, i.e., whether there is a caller waiting to be connected to the subscriber. If so, the subscriber may be advised that they have a call waiting by an appropriate message played before the connection is made at step 16. The subscriber may also be advised, at this step, when an additional party is also on the telephone, such as the party answering the phone call made at step 20. Of course, the test made at step 46 need not be accomplished if the call-meeting process described above is the only process which is performed by the system. Otherwise, when a subscriber calls into the system, and they have no call waiting, the processing falls through to block 50 where other functions may be performed, such as programming the system (for example to change the mode of operation, to change forwarding numbers, to change a schedule, etc.) or to give access to the subscriber's voice mailbox, etc. The call waiting test made at step 46 would preferably be done on a pre-preemptive basis so that even if the caller were in their voice mailbox and if a call were to come into the system from a caller, the subscriber's presence on the system would be detected at step 14 and the subscriber would be advised that they have call waiting. The subscriber and the caller can then be conveyed to a telephone meeting at block 16. Preferably, the subscriber would be first given the opportunity of meeting the call or conveying the incoming call directly to voice mail at block 30 in the event the subscriber wishes to continue his or her activities at block 47.

The foregoing description has been in the context of implementing the invention in a telephone-control system 40 of the type depicted in FIG. 1.

Figure 3:
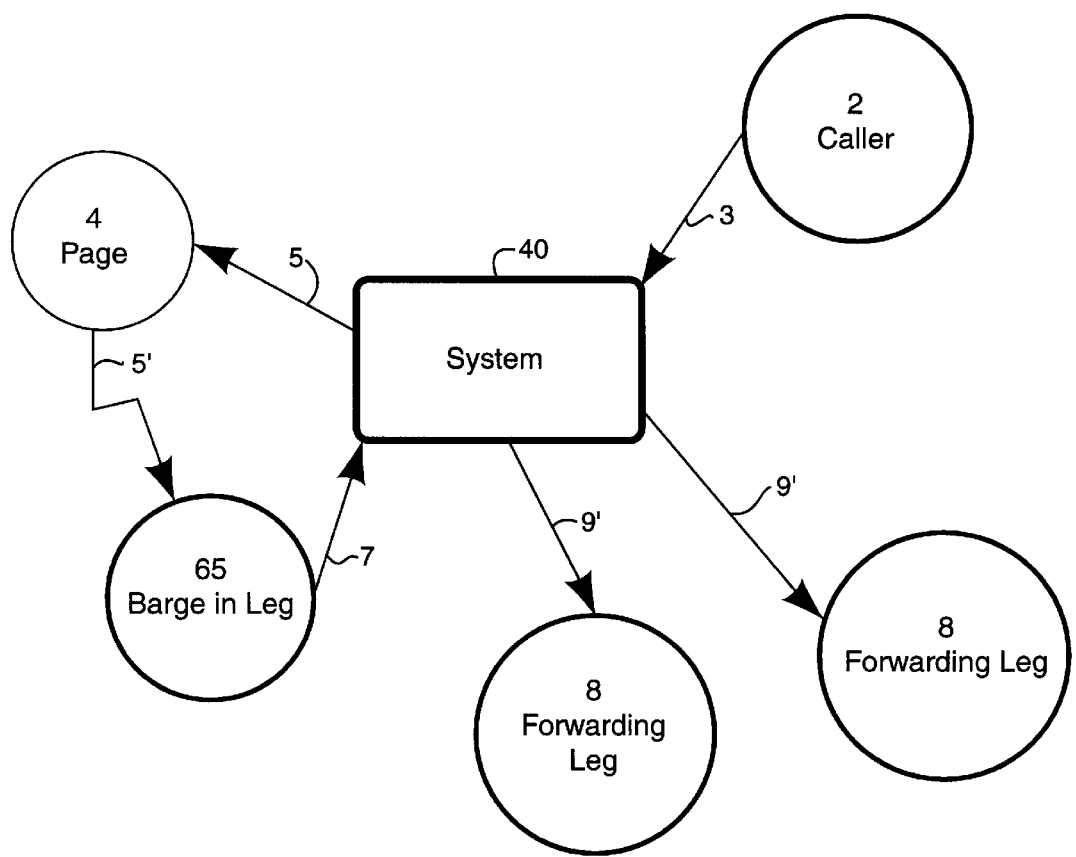
FIG. 3 shows how the system interacts with callers, subscribers and other persons.

Turning to FIG. 3, this figure shows the system 40 in which the present invention may be implemented and how it interacts with callers, subscribers and other persons. A call is initiated by a caller 2 who places a telephone call, designated by line 3, to system 40. The system responds by (1) paging the subscriber and (2) attempting to telephone the subscriber. Here the paging system is shown at numeral 4 and it is connected to system 40 by a communication facility 5 (which may be provided by the PSTN or by a dedicated channel). The paging system 4 transmits a paging signal 5' to the subscriber who carries a paging device on his or her person. The subscriber may telephone the system 40 from any telephone 6 interconnected to the system to barge into the call with the caller 2. This connection is called the barge in leg and is designated by the numeral 7. This leg of the call would typically be made via the PSTN. The system in addition to causing a page to occur also tries to contact the subscriber at a telephone 8 having a predefined telephone number. This connection is called a forwarding leg 9 and it may be made via a PBX with which the system 40 cooperates or via the PSTN. The system may initiate more than one forwarding leg (as is represented here by telephone 8' and forwarding leg 9') if it is desired to ring more than one telephone simultaneously with the placing of the page. For example, the system may be programmed to place forwarding leg calls to the subscriber desk telephone and to their car telephone during normal working hours whenever an incoming call arrives in the system 40 from a caller 2 for the subscriber, in addition to placing a page to the subscriber. Once the subscriber is placed in telephone contact with the caller any unused legs may be then torn down or they may time-out of their own accord.

A more detailed embodiment of the invention is now described with reference to FIGS. 4a–4j. The invention, as described with reference to these figures, can be implemented in the computerized switch of a telephone switching office or can be implemented in an adjunct computer which controls the switch 41 in a telephone switching office or can be implemented in a telephone control system 40 which is attached to or part of a PBX, for example, in a business. As will be seen, the invention as disclosed in this embodiment has many of the same features as the invention disclosed with reference to FIG. 2, but it has several additional features. For example, methods for handling long-distance or toll calls are established so that the caller is not charged for a toll call until such time as the caller's telephone call is answered either by the subscriber or by another person who picks up the telephone 8 or 8' on the forwarding leg. Of course, that is the typical way in which toll calls are charged. In the invention as disclosed with respect to FIG. 2, when a telephone call is received at step 10, answer supervision might then go back to the telephone company. Answer supervision not only tells the telephone company to start charging for the call but some long distance companies typically disable the voice channel from the caller until answer supervision is returned. The forward channel may be desired in some embodiments, since if no one answers the call, the caller may want to select voice mail, and the system would then need to hear the keys depressed by the caller in order to make that selection. Typically there is no need to enable the forward voice channel from the caller 2 until they are placed in contact with (i) the subscriber, (ii) a party who answered the forwarding leg call, or (iii) the voice mail system (so that the caller can leave a message—if no forward audio is available, the caller is preferably placed in voice at the end of a predetermined period of time). Thus, if the call at that step 10 were a long-distance call, a toll would be charged to the caller, even though they had not yet been connected to the subscriber (or anyone else), if answer supervision were given at that time. The invention as it will now be described now, with reference to FIGS. 4a–4j, overcomes this and other drawbacks and adds additional features, as will become clear.

These flow diagrams generally correspond to the software listing which is appended to the patent as Appendices I–VI.

The software is written in a language which is specifically adapted to test telephone system technology and is called VOS (Voice Operating System). The software is available from Parity Software Development Corp., of San Francisco, Calif. and runs on the hardware environment or system 40 depicted in FIG. 5, which will now be described. The hardware environment of the system 40 includes an IBM compatible PC (personal computer) 90 having CPU of the Intel 486 family or better. Preferably, the computer is an AST Bravo MT 486DX2 66 with 16 Meg of RAM, a large SCSI hard drive, two serial ports, one parallel port, mouse, video and DOS Windows, or equal. The VOS software supports limited multitasking. The flow diagrams, which will now be described, assume that the system 40 runs in a multi-tasking environment and those skilled in the art will appreciate in comparing the flow diagrams with the computer code listing that certain compromises were made in implementing the flow diagrams into code.

Figure 5:
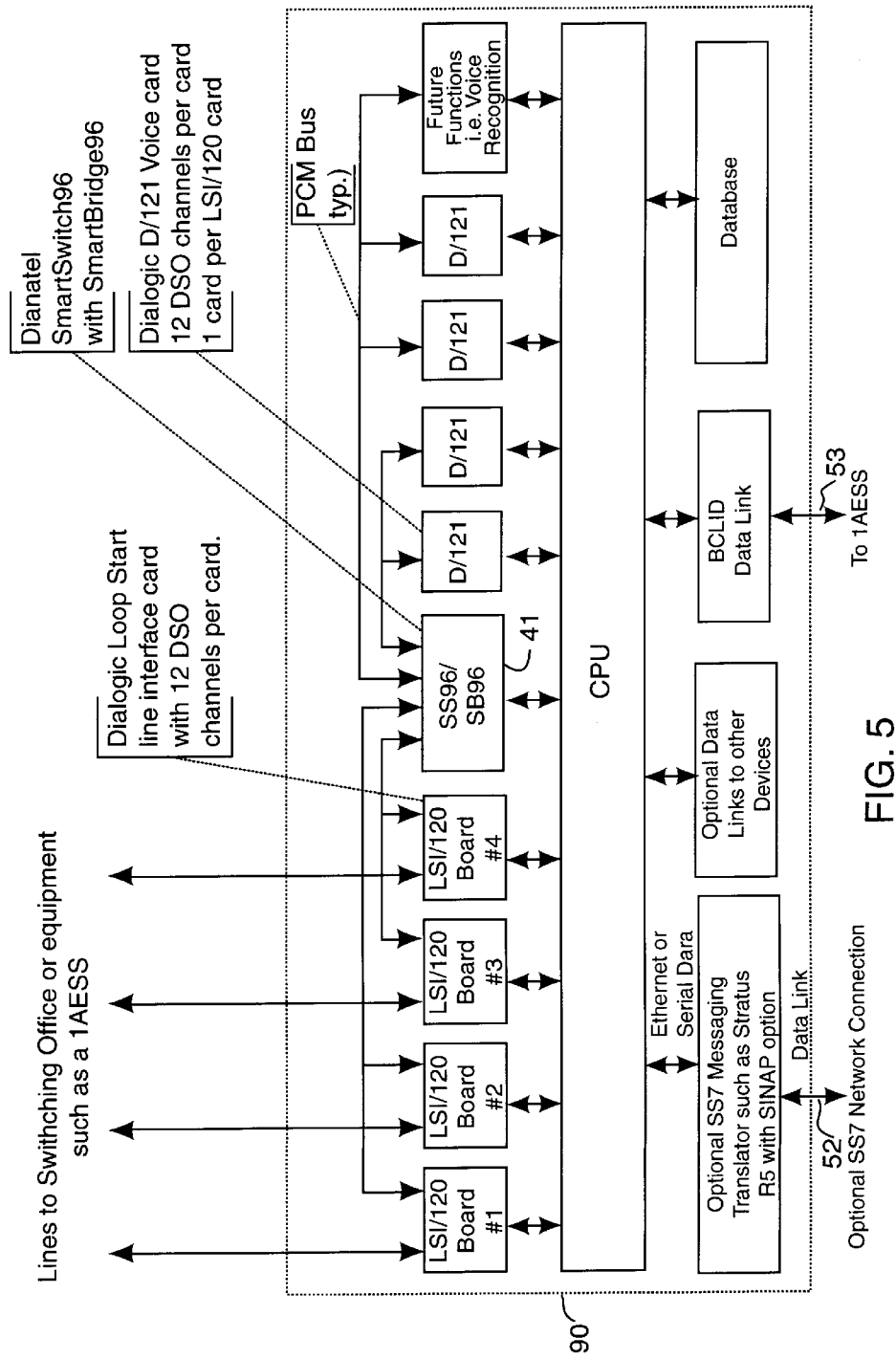
FIG. 5 is a schematic diagram of a hardware environment for the system which connetcs with telephone company lines.
Figure 6:
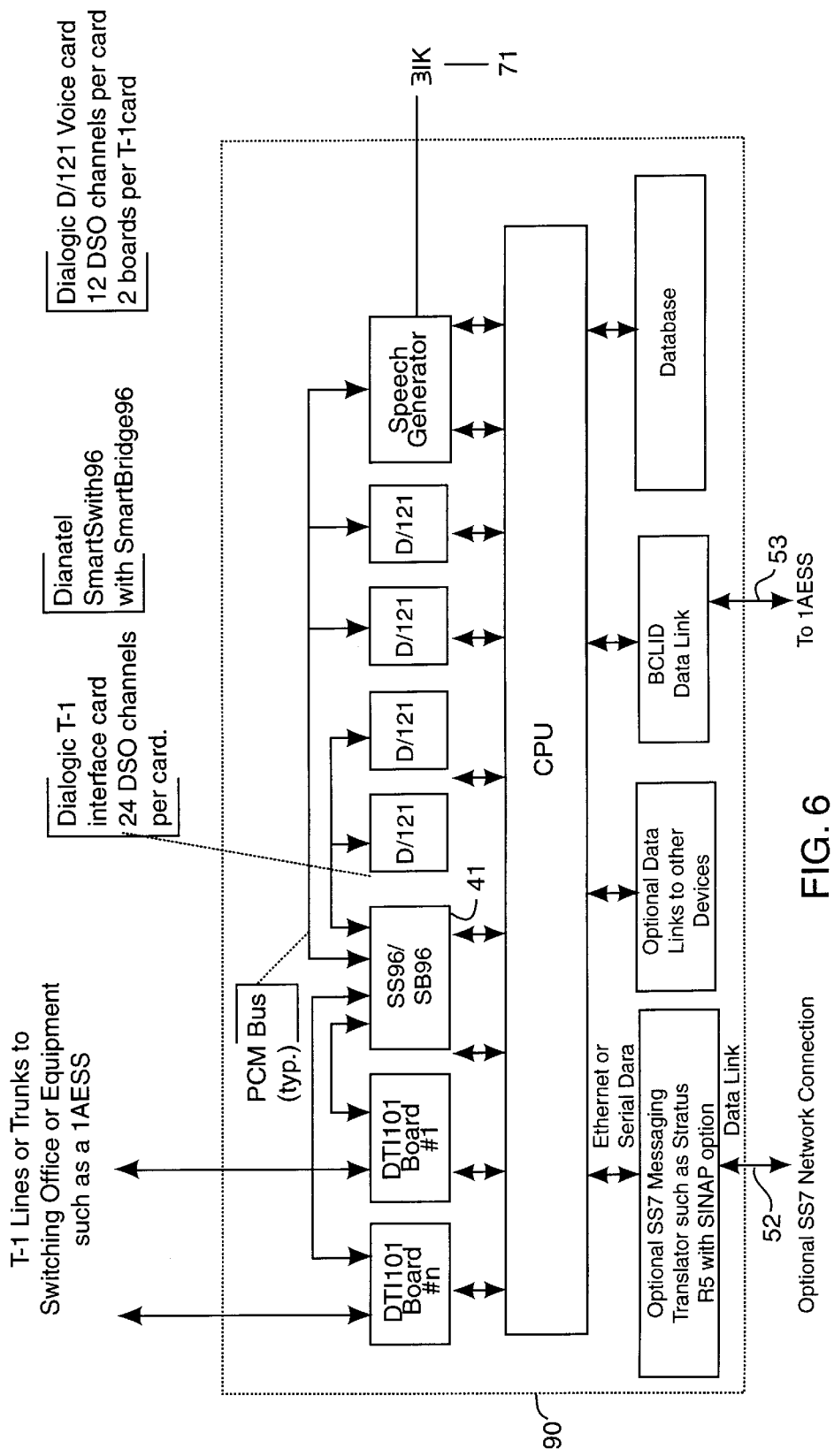
FIG. 6 is a schematic diagram of a hardware environment for the system which connects with telephone company T-1 trunks.

The hardware platform also preferably includes a Dianatel SmartSwitch96 with SmartBridge96 (switch serves as switch 41 in system 40), Dialogic LSI/120 interface cards, and Dialogic D/121 voice cards. These cards plug into the computer motherboard and are also connected to each other via PCM data busses, as shown in FIG. 5. The software listing in the appendices and the Dialogic cards identified above and in FIG. 5 are set up for working with POTS (Plain Old Telephone Service) loop start lines. With small adaptations to the code and by selecting different interface cards (also available from Dialogic), then T-1 trunks can be used instead. FIG. 6 shows the hardware platform with Dialogic cards installed in the PC for use with trunks 51. In either case, this hardware environment can only support a limited number of active incoming calls. This is fine for a typical business application, such as where the hardware controls a PBX installed at the business, but if this system is to be scaled up to work with large numbers of callers, such as at a telephone switching office, then a more robust hardware/software environment should be used. Those skilled in the art will appreciate that several PCs can be used in tandem and certainly more powerful CPUs can be utilized. VOS was selected as the development environment for the software, but those skilled in the art may choose to use another language in which to program the invention. The computer may be used to generate sounds, especially if a sound board is added. For example, a SoundBlaster board can be used to generate sounds and computer generated speech as well as using known boards of the SoundBlaster type. The computer may be equipped with a sound generation board if it is desired to generate call announcements over speakers 71 (FIG. 1). Thus the signaling system may be provided by a conventional pager system or a digitized speech system which delivers audible communications over speakers 71 or by a combination of the two systems. Additionally the Dialogic D/121 voice cards can produce digitized voices stored, for example, on the hard drive, in telephone connections with callers 2, subscribers 65 or parties 8.8' on the forwarding legs. Thus a means for producing courtesy messages to users of the system 40 is available.

Additionally, the system may be connected to receive Signaling System Seven (SS-7) messages from the telephone company. SS-7 is well known in the telephone industry, and therefore does not need to be described here. FIG. 5 depicts an optional SS-7 messaging translator which can be embodied in a R-5 computer by Stratus with SINAP option.

The main task 100 is shown in FIG. 4a. The main task 100 starts off by a step 102 in which the variables which are used during the processing are set to their default values, typical initialization routines run, drivers loaded, etc. After the variables are set up and other housekeeping chores accomplished, the processing falls through a loop which is made around a test made at step 104 to determine if a new inbound call has been received. The inbound call could be a call 3 from a caller 2 or a barge-in or meet-me call 7 from the subscriber or a call from the subscriber merely to check their voice mail, to update one or more forwarding numbers stored in the system or a schedule of forwarding numbers, etc. If a new inbound call has been detected, the processing falls through first to step 106 where the inbound channel is determined, then to a step 108 where the Calling Line IDentification (CLID) is obtained (if available) and then processing then falls through to step 110 where the Inbound Task 200 is started to process the call on the indicated channel.

The Inbound Task 200 is shown in FIGS. 4b1–4b6. The Inbound Task 200 starts off by obtaining the direct inward dial number at step 201. In this embodiment, it is assumed that the subscriber uses one telephone number to call the system, while the subscriber's callers use a different telephone number to call the system. Therefore, the subscriber and the caller can be differentiated by the DID digits. Those skilled in the art appreciate, of course, that the DID digits are supplied by the telephone company to the system. At step 202, a test is made to determine whether the DID digits correspond to the telephone number used by the subscriber in order to gain access to the system. If the DID digits indicate that the subscriber has called in, then the processing falls through to step 230, which is continued in FIG. 4b3. Otherwise, a test is made at step 204 to determine if the DID digits indicate that a caller is trying to telephone a subscriber. If the DID digits do not result in a positive test at either step 202 or 204, the processing falls through to step 205 where the call is disposed of and the task is then suspended at step 206.

By way of a practical example, subscriber 1 may have a telephone number 555–7000 for use by callers and a telephone number 555–7001 for use by the subscriber to gain access. A second caller may have telephone numbers 555–7010 for use by callers and 555–7013 for use by the subscriber to gain access. Of course, it would be envisioned that many more subscribers would be on the system than in this small example, but in this example, the valid DID digits would be 7000, 7001, 7010 and 7013. If a call were made to 555–7009, the processing would fall through to step 205 where the call would be disposed of. That could be by, for example, playing a message to the caller indicating that they had reached an unassigned telephone number. If the DID digits indicate that a call were made to 555–7013, then that call would be identified as a call from the second subscriber for the purpose of gaining access to the system (e.g. to barge into an existing call or to perform other functions). Similarly, if the DID digits indicate that a call were made to 555–7000, that call would be identified as a call to from a caller directed to the first subscriber.

Assuming that the caller dialed a valid caller access DID, such as 555–7000 for the first subscriber on the system, the processing then falls through to step 207 where the variable "call active" is set (become true) for that particular subscriber. Processing then continues on to the next block 208 where the Caller Disconnect Task 900 is started. The Caller Disconnect Task is described in detail with reference to FIG. 4i. After the Caller Disconnect Task has been started, the processing then drops to step 209 where a test is made to determine whether or not the subscriber is active on the system. The subscriber might be active on the system since they may be engaged in another telephone call with another caller; or they may be picking up their voice mail messages; or they may be programming the system; or they may be on the system for some other purpose. If the subscriber is on the system, the processing continues on FIG. 4b6 via connector 240. Assuming that they are not then on the system, the processing falls through the no-leg of step 209 to block 210 where a Timer Task 1000 is started, followed by block 212 where a Paging Task 300 is started, and then block 213 where a Forward Leg Task 500 is started. As previously described the system may be programmed to forward the call on a number of forwarding legs simultaneously or in sequence. The system includes a database which stores the various forwarding numbers for a subscriber along with perhaps a schedule indicating at what times the various forwarding numbers are effective. For example, during working hours, including the time the subscriber is normally commuting to and from work, they may decide to have both their work telephone number and a cellular number stored as their forwarding numbers for that time period. At other times they may have their home telephone number stored as the forwarding number and at still other times they may have programmed the system to direct calls to the voice mail box or invoke call screening options. Such personal preferences would be preferably stored in a database associated with the system. At the point the processing reaches the block labeled "Start Forward Leg Tasks," the Inbound Task would look to the database not only to determine the forwarding number then in effect, but preferably also to determine if multiple forwarding numbers were then in effect. If so, the Forward Leg Task 500 would be repeatedly called at this point, once for each forward leg required.

It is to be recalled that this is a multi-tasking environment such that the Timer Task, Paging Task, the Forward Leg Tasks, and the Caller Disconnect Task can all be running simultaneously with this particular Inbound Task. Multiple instances of the Forward Leg Task and associated disconnect tasks may also be running. Finally, multiple instances of the Inbound Task are likely to be running together with its progeny, i.e., the tasks it calls either directly or indirectly. After the Forward Leg Task is started at block 500, processing falls through to step 214 where the caller is added to a conference facility. In due course, assuming that the subscriber makes contact with the system, the subscriber will also be added to that conference. If multiple callers are on the system at the same time trying to contact different subscribers, then multiple conference are similarly set up. After step 214, the processing falls through a connector labeled with the numeral 215, which can also be found on FIG. 4b2.

Referring now to FIG. 4b2, the processing now enters a loop comprising steps 216, 217, 218, 219 and 220. If the party on the forwarding leg enters a ##9 at the keypad of their telephone, that action is detected at step 218 and the loop is exited. If voice mail has already been started, as is tested at step 217, then step 218 is skipped. If a forwarding leg has been answered then the test made at step 219 will cause the processing to exit via its "yes" leg to block 221. If the subscriber has barged into the conference on the barge-in leg 7, then the variable "barger active" will be true (active) and a test made at step 220 will cause this loop also to be exited to block 221. If the Timer Task 1000 times out then the loop exits by the test made at step 216 and a test is made at block 222 is see if voice mail is available. In this embodiment it is assumed that voice mail is provided by a separate service provider available via the PSTN 50 (such a service provider may have a voice mail equipment of the type made by Octel, for example). Thus, some subscribers may opt not to subscribe to a voice service and that choice would be stored in the aforementioned database (together with the telephone number of the voice mail service, if available for the subscriber). Thus, the test made at block 222 can be determined by examining the database, for example. If voice mail is available, the Voice Mail task 700 is started if it is idle for this subscriber at step 223. At block 224 the system would preferably inform the caller of the transfer to voice mail (assuming it wasn't idle) and then processing passes via connector 290 to a loop on FIG. 4b5. Similarly, if voice mail is not available, the caller would be preferably informed of that fact at block 226, after which the caller active variable would be set inactive (false) at step 227 and the task suspended at 228.

If a forward leg is answered or if the subscriber barges into the conference, then the processing falls out of the loop to block 221, as previously mentioned. At block 221 answer supervision is returned to the caller (i.e. toll charges start if it is a long distance call and too-way communications become available—two way communications are often inhibited by long distance carriers until answer supervision is returned). After block 221 a small loop is entered which comprises steps 230 and 231. If the caller enters ##9 in this loop, the loop exits to step 222. If voice mail is already active, then the task may suspend. Preferably the small loop would also include a test to determine whether the caller remained in the small loop for an extended period of time. If so, the processing should exit to block 222, i.e., treat the call as if the caller had entered the ##9 in order to gain access to the voice mail system. The reason for this is that the forward leg may answer the call and the party on the forward leg may tell the caller to wait for the subscriber to barge in. If the subscriber does not respond to the page, then there should preferably be a mechanism for exiting the small loop other than waiting for the caller to touch the ##9 keys or to place their phone on hook.

Turning now to FIG. 4b3, assuming that the digits detected at step 202 were associated with the subscriber barge-in telephone number, such as 555–7001 in the prior example, the processing falls through connector 232 to step 233 where answer supervision is returned for the barger's telephone call. At step 234 the Barger Disconnect Task 400 is started. Processing then continues on to step 235 where the person calling on the barger DID line is asked for a personal identification number. In this embodiment, it is envisioned that the subscriber has two personal identification numbers, one for the purpose of programming (which may be a longer, more complex PIN) and the other to meet a caller in the conference (i.e. to barge into the conference) (for which a different PIN, which is preferably shorter, or even non-existent, to make it easier to enter and to gain access to a telephone call). If the subscriber has entered their programming PIN, the test made at step 236 is satisfied, and processing falls through to step 237 wherein the barge subscriber can change their program variables, their forwarding number(s), voice mail attributes, the schedule, or gain access to their voice mail system. Those tasks are not described in detail here because they are known in the art. If the person calling on the barge-in line inputs the barge-in FIN at step 238, it must be the subscriber who is trying to join the conference. Processing then falls through to step 239 where a variable barger active is set true and a test is made at step 240 to see if the caller is active. Normally, if the subscriber is responding to a page, then the caller is active, and processing is continued via connector block 274 to FIG. 4b4. If the caller is not active, the subscriber is advised at step 2241 that there is no call-waiting, and processing returns back to step 235.

Referring to FIG. 4b4, now that the subscriber has been identified as wanting to barge into the telephone call with the caller, and since the caller is in a conference (see step 214), the barger is added to that same conference at step 275 and a tone is played at step 276 which all parties in the conference can hear so that they know that the subscriber has joined the call. The processing on the barger leg 7 then enters a loop at steps 277, 282, 284 and 285 to determine whether the subscriber 65 enters certain codes at his or her keypad of their telephone instrument 6. In the example shown in FIG. 4b4, the loop tests for ##8 or ##9 to be entered. If ##8 is entered, that will set the forwarding leg inactive at step 283, and as will be seen, that action will disconnect the forwarding legs 9, 9' if it (they) have been connected. If the subscriber enters ##9, the voice mail task 700 is started if it is idle and assuming it is available, as tested at step 286. If not available, a courtesy message is preferably played, as at step 287 and the loop is reentered. If more than one caller have telephoned the subscriber at more or less the same time, they will join separate conferences and the variable "call waiting" will be set active (i.e. true). The test at step 277 tests for that variable, and if it is true, then a test is made at step 278 to determine whether a call waiting beep has already been played for the subscriber indicating that a second caller is on the line. If not, the beep is played at step 280. The beep need only be played once to indicate that a particular caller is waiting in the other conference (but it would certainly be simple to play the beep more than once). The subscriber can switch or toggle to the other conference at step 281 by keying in ##3 as tested at step 279. Since the subscriber stays in this loop, they can toggle back to the original conference again by keying in a ##3. The loop has no explicit exit, but it is exited when the Inbound Task for the barger is suspended by the Barger Disconnect Task 400.

One of the advantageous features of the present invention is that either the subscriber or the caller or any party on a forwarding leg can start the voice mail task 700 when they are in telephone communication via the conference with another party so that a joint message may be left in the subscriber's voice mailbox. This can be very useful in certain situations. For example, the subscriber may be in their automobile connected to the system via a cellular telephone. That can be a very inconvenient, indeed, and an unsafe time, to take notes. By allowing the voice mail to be started while the parties are in the conference, by any party, it allows a voice note to be stored to which the subscriber can go back and listen when he or she is in a more convenient location. As has been described, the system also permits the caller to start the voice mail task 700 (see step 218) so that the subscriber need not take his or her hands off the automobile in order to have the voice mail task 700 started.

Turning now briefly to FIG. 4b5, after connector 290 a brief loop is entered comprising steps 292 and 294. If the voice mail system responds (i.e. it answers a call placed to it), then the loop is exited and answer supervision is returned to the caller at step 296. Otherwise, if voice mail is inactive (it did not start or could not start) then a courtesy message is preferably played to the caller at step 297 and the caller is then set inactive, which will bring down the connection by the Caller Disconnect Task 900. The current task is suspended at 299.

In FIG. 4b6, if the subscriber is on the system when the caller telephones the system, the test made at step 209 exited via connector 240 to FIG. 4b6 where a test is made at step 241 to see if Call Waiting is enabled. Call Waiting is typically a premium service, and even if it is not, some subscribers may not like the Call Waiting feature. The subscriber's choice is stored in the database and if the subscriber has elected against this service, the processing then falls to step 242 to determine if the subscriber has Voice Mail services. If not, the processing exits through steps 248 and 249 before suspending this task at step 250. If yes, the Voice Mail Task 700 is started at step 243, a courtesy message is played at 244 and a loop is entered containing steps 245 and 246. If the voice mail services respond, as tested at step 246, answer supervision is returned at step 247 and thereafter this task is suspended, If there is no response from the voice mail service, the loop exits at test 245 and the processing falls through steps 248 and 249 before suspending this task at step 250.

If Call Waiting service is enabled, as tested at step 241, a test is made at step 251 to see if the subscriber already has two different conferences active. If so, the subscriber probably does not want to bother with a third conference, so the third caller is conveyed to voice mail, assuming it is available. However, if the present caller is the second caller that means that the subscriber presently only has one conference active and the call waiting variable is presently false (call waiting inactive). Thus, the processing falls through the no-leg to step 252 when the present caller is added to a new conference. Next, the call waiting variable is set to true at step 253 before suspending the task at step 254, so that the system is aware that the subscriber has two conferences active between which the subscriber can toggle.

Turning now to the Paging Task 300, that will now be described with reference to FIG. 4c. Recall that the Paging Task runs in concurrently with the Inbound Task after the no-leg is taken from step 209 (FIG. 4b1). When the Paging Task is started, an outbound channel is seized at step 302. The telephone number of the subscriber's paging system is dialed at step 304. Appropriate I.D. Information is output to the pager at step 306—this will preferably include the CLID of the caller (if available) so that the pager can display the telephone number, name or other information about the caller on the display of the pager. The CLID, if available, can also be used to look up information about the caller in the database for transmission to the subscriber. Thereafter, the paging channel can be disconnected at step 308. This processing assumes, of course, that the pager is controlled by a typical dial-up pager connected via the PSTN 50. That is a common way of dealing with the pager, since the pager system facilities are often provided by a separate company. However, another way of dealing with the pager system is to use a direct, dedicated connection between system 40 and the pager system, so that instead of seizing an outbound channel and dialing the pager company via the PSTN, such as shown in steps 302 and 304, the system would preferably seize the dedicated connection to the pager company and output the necessary information directly at step 306. Additionally, the Pager Task can also be used to instruct a digitized speech system to deliver audible pages over speakers 71. Indeed, the Inbound Task 200 can start more than one instance of the Pager Task 300 so that the subscriber is paged both audibly and via a conventional pager device 61, if desired. At the same time the Paging Task(s) 300 is (are) being run, the Forward Leg Task(s) 500 is (are) also being run.

Figure 4D:
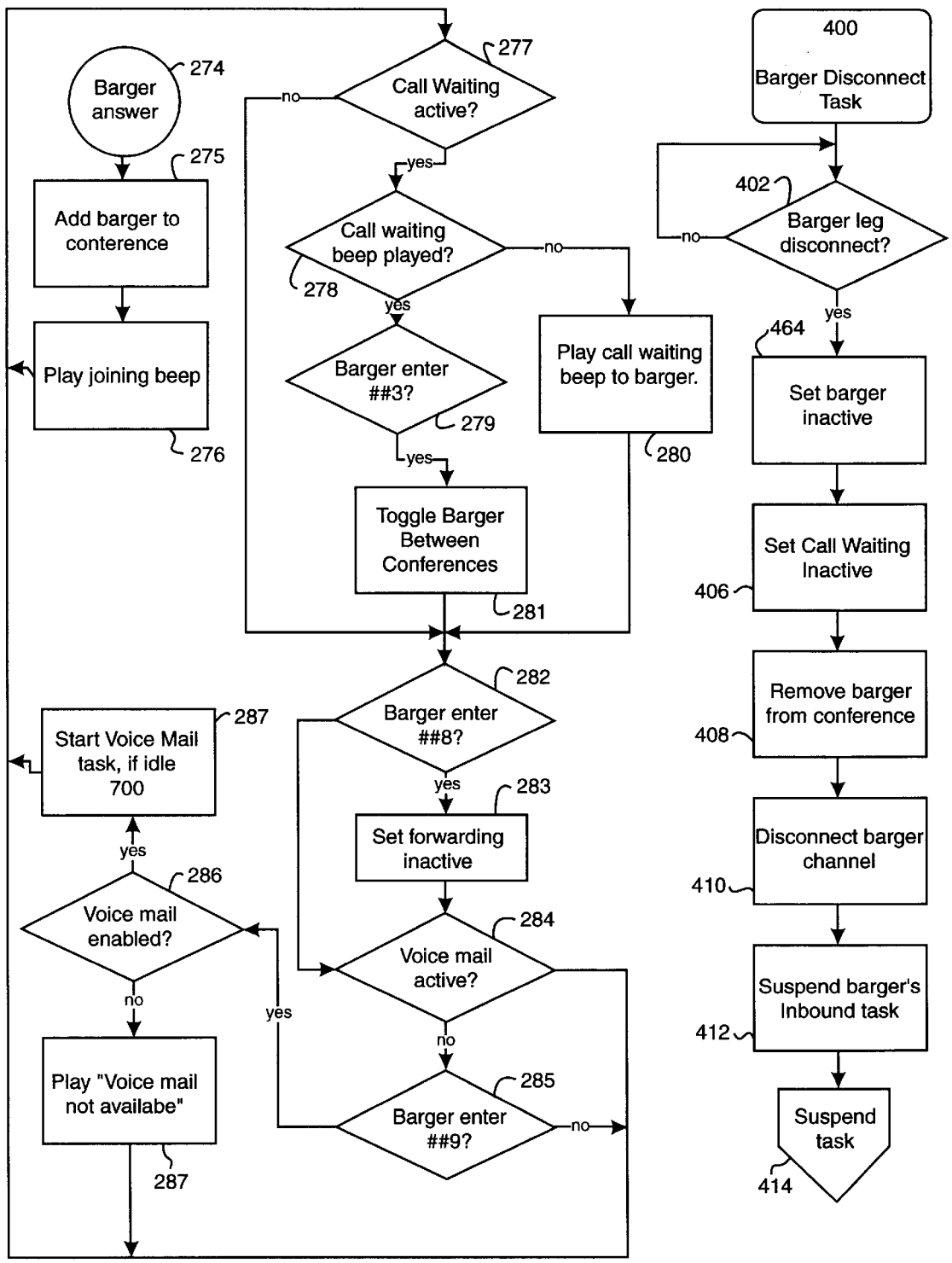

The Barger Disconnect Task 400 is shown at FIG. 4d. A test is made at step 402 to see if a disconnect which has occurred on the barge in leg 7. If so, the barger variable is set inactive (false) at step 404 and the call waiting variable is similarly set inactive (false) at step 406. The subscriber is disconnected from the conference at steps 408 and 410. The caller and the party on an active forward leg will remain in the conference. This is a useful feature. The subscriber may barge into a conference and find their secretary and the caller already engaged in a conversation. The subscriber's secretary, in this example, is on a forward leg 9, 9'. If the secretary can handle the matter for the caller, the subscriber can simply excuse themselves from the conference and hang up—the caller and the secretary on the forward leg remain in communication. Before suspending the Barger Disconnect Task at step 414, the Inbound Task 200 which the subscriber (barger) is one is suspended at step 412.

The Forward Leg Task 500 will now be described with reference to FIGS. 4e1 and 4e2. The forwarding active variable is set at step 502 and then an idle outbound channel is seized at step 504. The number of the telephone 8 on the forwarding leg 9 is then dialed at step 506. This may be a number available via the PSTN or maybe an extension number of a directly connected PBX. The forward leg channel is then added to the conference at step 508 so that the calling party can hear the call progressing. If multiple legs are being utilized, then it would probably be preferable to delay adding a forward leg to the conference until the forward leg is answered, otherwise hearing multiple legs being dialed and/or ringing more or less simultaneously would not be especially helpful to the calling party. In that case, or alternatively, a message could be played to the caller informing that the system is attempting to contact the subscriber at a number of locations. The forward leg disconnect task 600 is then started at step 510, and thereafter, the processing falls to step 512 where a test is made to determine whether the forward leg call has been answered. If so, the processing will then continue via connector 530 to FIG. 4b2. Otherwise, a test is made to determine whether the forwarding leg is busy at step 514 and whether the timer is active (see the Timer Task 1000) at step 516. If active (i.e., the timer has not timed out), the program loops, waiting for the forward call to either answer or for the timer to time-out. If the timer becomes inactive or if a busy condition is detected, then the processing falls through to step 518, where a test is made to determine if voice mail is available. If so, the Voice Mail Task 700 is called at step 520, unless it has been previously called for the conference to which the forward leg was added at step 508, otherwise a courtesy message is played at step 522. Forwarding is set inactive at block 524 to remove this forward leg from the conference and to disconnect the forward leg channel. The Forward Leg Task is thereafter suspended at step 526.

A busy condition can be tested by a number of different techniques. For example, the system can be listening for the telltale busy sound. The Dialogic card previously mentioned have such capability. If the system is connected to receive Signaling System Seven data, then a data packet can be returned to the system without even the need to open an audio channel to the number being telephoned. Finally, when the system is connected to or with a PBX, the PBX can readily advise whether or not an extension is busy.

Assuming that the forwarding leg call is answered at step 512, the processing continues via connector 530 to the flow diagram of FIG. 4e2 where a loop is entered, comprising steps 531–534. A test is made at 532 to see if the person on the forward leg enters a ##9. That person would typically be the subscriber but could be a third party who answered the callers telephone. If they enter ##9, the Voice Mail Task 700 is started, if idle, at step 533. The test at step 534 determines whether the caller or barger is active. If neither the caller 2 nor subscriber on the barge-in leg 7 is active, there is no point in allowing the forward leg to remain up so the processing falls through to step 536 where the forwarding is set inactive, and thereafter, the forwarding task is suspended at step 538.

Figure 4I:
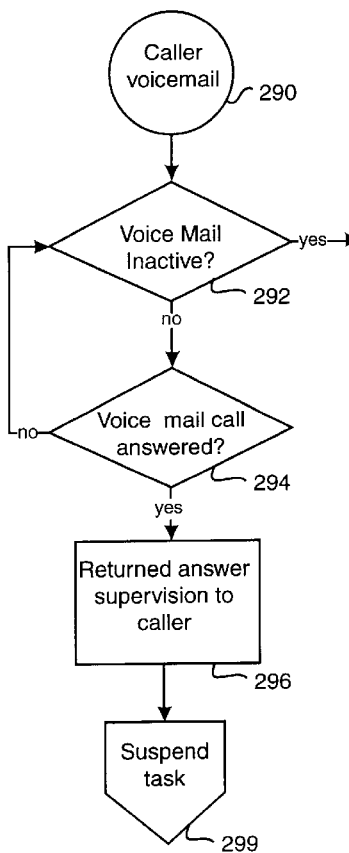
Figure 4I:
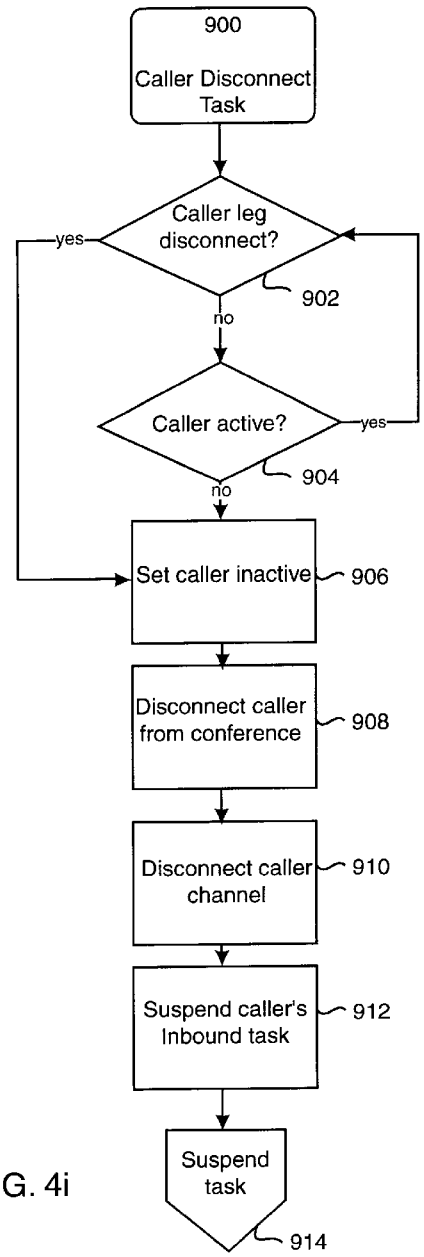
Figure 4F:
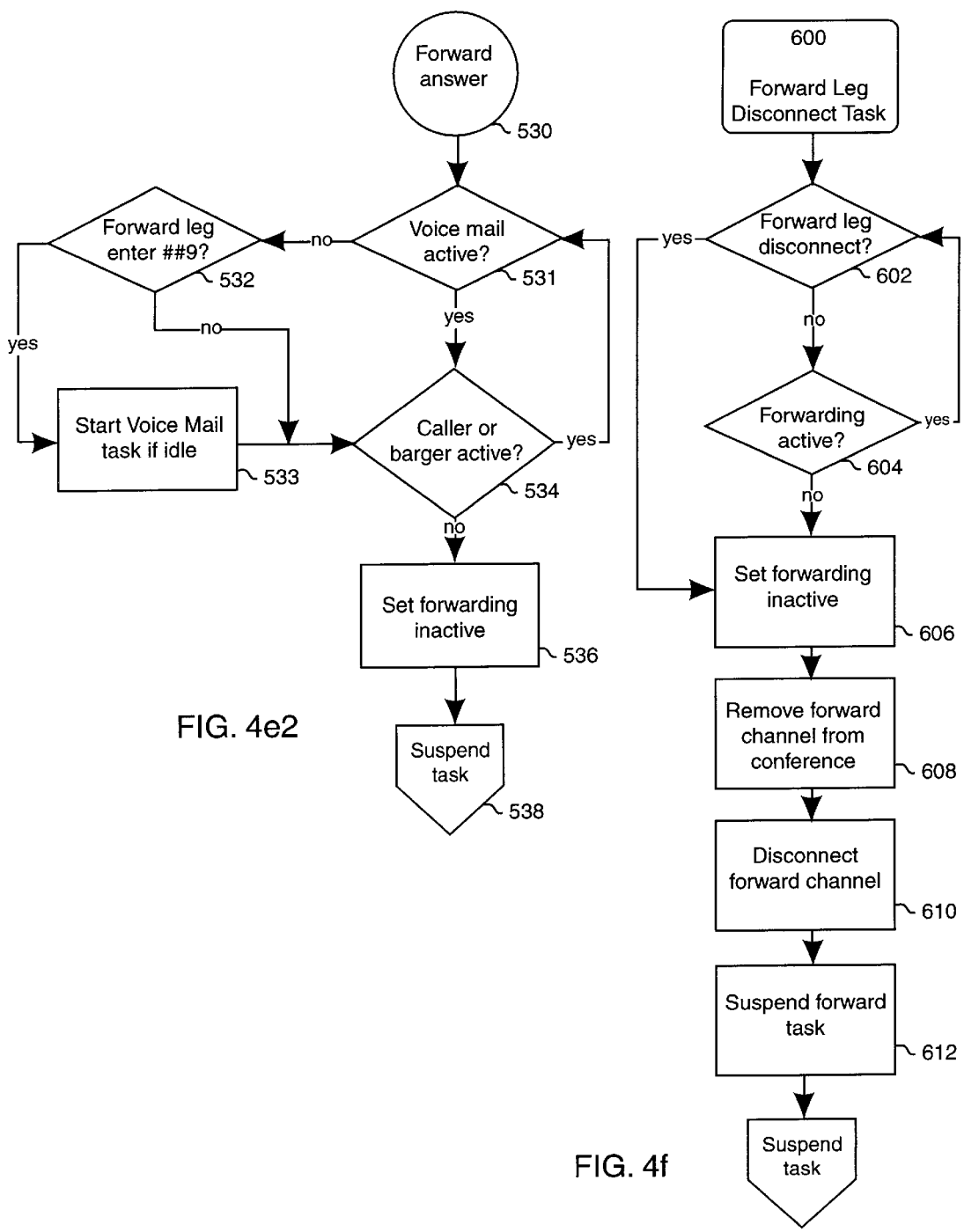
Figure 4G:
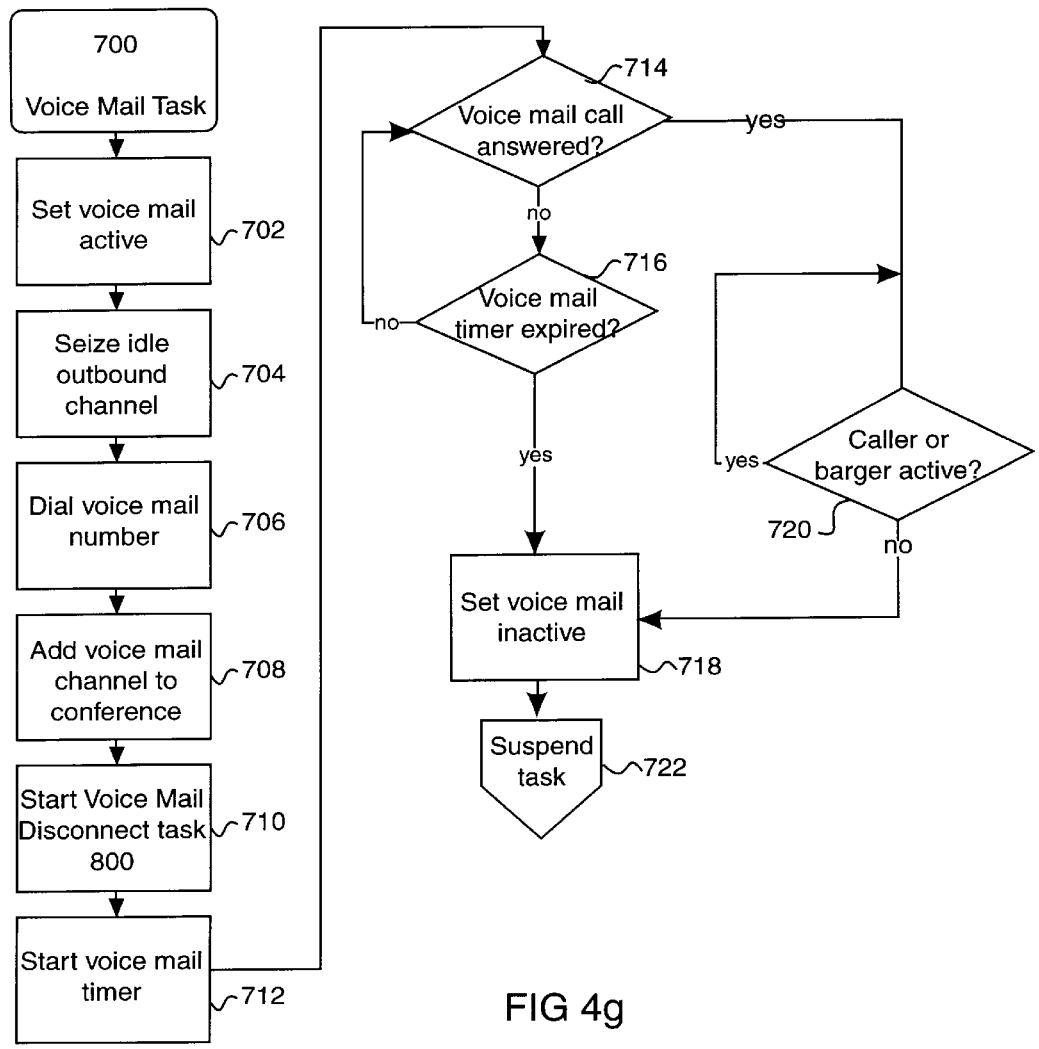

Turning now to FIG. 4f. The Forward Leg Disconnect task 600 is now described. This task bears some resemblance to the Barger Disconnect Task 400 previously described. Here, the initial loop comprises two tests, made at steps 602 and 604, instead of one test. The test made at step 602 detects whether a disconnect has occurred on the forward leg which this task is monitoring. The test made at step 604 tests a variable "forwarding active" to see whether forwarding is active. If it has been set inactive, then the forward leg is brought down, i.e., disconnected. This can occur, for example, under control of the subscriber on the barge-in leg, if the subscriber on the barge-in leg satisfies the test at step 280, for example, by depressing ##8, in which case forwarding leg active variable is reset (set inactive). In that way, the subscriber on the barge-in leg can cause the forwarding leg to disconnect. That can be useful where the subscriber wants to make sure they have a private conversation with a caller, without fear of having someone eavesdropping on a forward leg 9, 9'. Otherwise, if a party is on the forward leg, the subscriber is on the barge-in leg, and the caller is on the caller leg, a three-way (or more) conference will be in place.

After the loop is exited, forwarding is set inactive at step 606 and the leg is removed from the channel at 608, disconnected at 610 and the associated Forward Leg Task 500 is suspended at 612. Then this task suspends itself at 614.

As previously discussed, Voice Mail Task 700 is preferably provided which can attach the members of the conference to the subscriber's voice mail system so that notes may be taken. The voice mail task 700 is described now with reference to FIG. 4j.

In this embodiment, it is assumed that the voice mail system is a separate stand alone voice mail system, and that the subscriber's voice mail may be contacted via the PSTN 50 by telephoning a particular number and then inputting appropriate codes into the voice mail system. Alternatively, the voice mail system may be embodied with system 40 or may be connected, instead of via the PSTN, by a direct and dedicated connection. Assuming for the moment that the voice mail system is a separate stand-alone system connected via the PSTN, the voice mail variable is set active at step 702, an output channel is seized at step 704, the voice mail telephone number is dialed at step 706 and appropriate codes to access the subscriber's voice mailbox are output at step 708. The codes may be stored in the previously described database. Thereafter, at step 708, the voice mail channel is added to the conference, and the voice mail disconnect task 800 is then started at 710. Next, a voice mail timer is started at block 712 to ensure that the voice mailbox is answered within a predetermined time period. That test is made by looping at steps 714 and 716. If the timer expires, the voice mail variable is set inactive at step 718 and the task suspended at step 722. If the voice mail system answers, as is tested at step 714, the processing falls through to a short loop at step 720 where a test is made to see if the caller or the barger is active. If neither one are active, the processing falls through to step 718 where voice mail is set inactive and the task is then suspended.

Figures 4H, 4J:
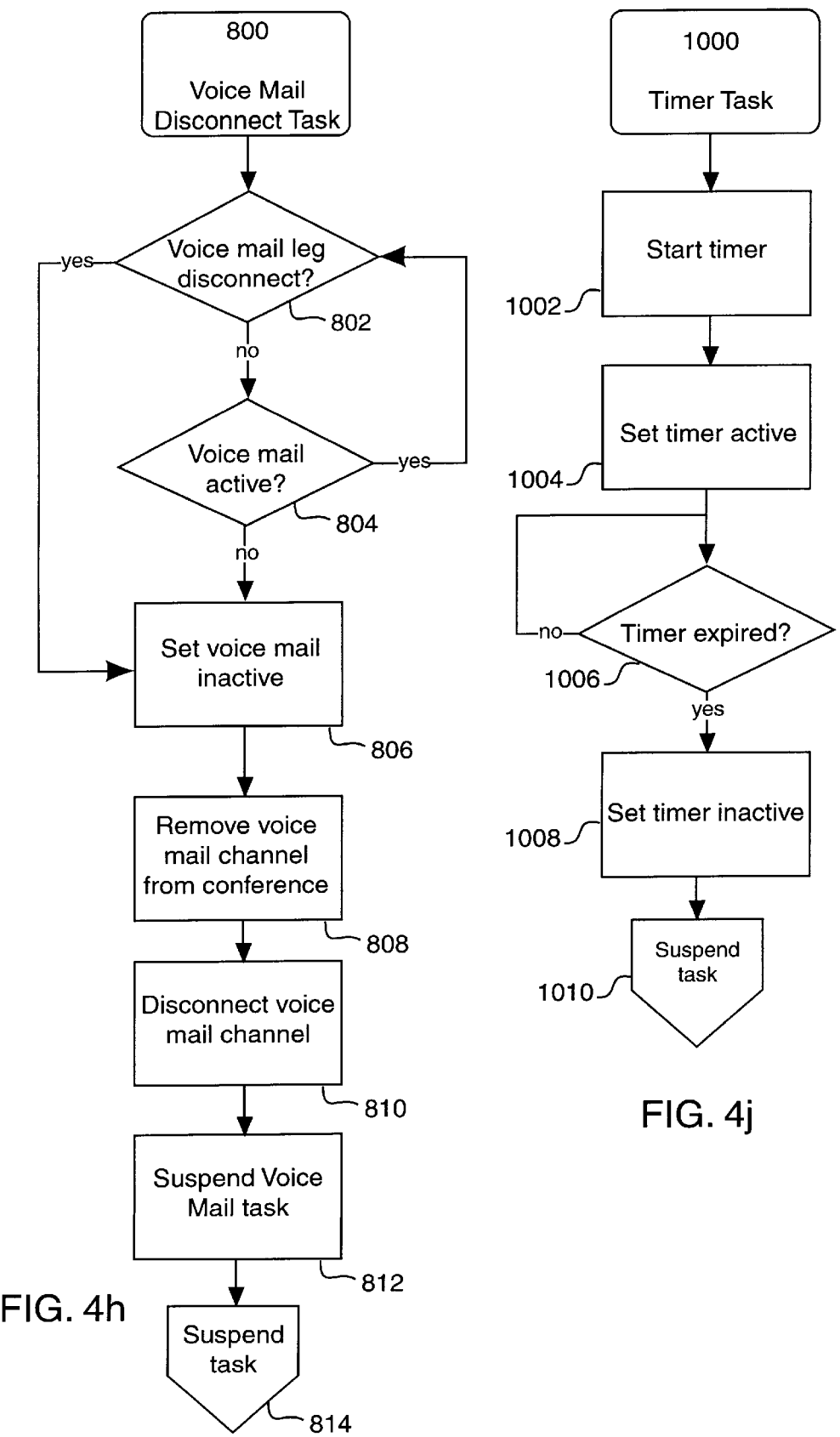

The Voice Mail Disconnect task 800 is shown in FIG. 4h. A test is made at step 802 to see if a disconnect has occurred on the voice mail leg. Normally, one would not expect a voice mail system to disconnect, but that could occur, and therefore, a test is made for that event at step 802. More likely, some action will set voice mail inactive, in which case the processing will fall through from the test made at step 804 to step 806, 808 and 810. At step 806, voice mail set inactive, if not already done so by some other action. The voice mail channel is removed from the conference at step 808, the voice mail is disconnected at step 810, the voice mailbox task is suspended at step 812, and the voice mail disconnect task suspends itself at step 814.

The Caller Disconnect Task 900 is shown in FIG. 4i. This figure is very similar to FIG. 4f, and therefore, it is not described in detail other than it is noted instead of checking a forward leg 9, 9', the caller leg 3 is checked. If the caller active variable becomes inactive, the caller link is brought down. That could occur, for example, by the subscriber entering a defined key sequence while in the loop depicted on FIG. 4b4. Of course, that would require another test in that loop to detect the additional key sequence, and then the subscriber would have the ability to cause all connections to come down.

The Timer Task 1000 is depicted in FIG. 4j. This task starts a timer at step 1002 to set the timer active variable at step 1004. A test is made at step 1006 to determine if the timer has expired. If so, the processing falls through to block 1008 where the timer variable is set inactive and then the task suspends itself at step 1010.

Comparing the functionality of FIGS. 4a–4j with the system described in FIG. 2, those skilled in the art will, of course, appreciate that the system conforming to the flow chart of FIGS. 4a–4j is much more robust. In FIG. 2, provision is made for the ability to park the caller and for a parked timer to expire. See, for example, steps 38–44. In the present multi-tasking embodiment described with reference to FIGS. 4a–4j, there is no need to explicitly park the caller. If the person answering the telephone on the forwarding leg hangs up, that brings down the forwarding leg, but does not affect the caller on the calling leg 3. During that time, the Inbound Task would still be looping during the loop comprising the steps 216–220.

Additional Features

Additional features are envisioned for the disclosed system. The hardware environment may include the ability to decode SS-7 messages, as previously described. The SS-7 facilities being implemented in the PSTN can provide messages to the system 40 indicating, for example, that a subscriber has turned on their cellular phone 81. Each time a cellular phone is turned on it must sign onto the cellular system 80 with which it communicates. The cellular system 80 can send a SS-7 message to system 40 informing the system 40 that the cellular telephone 81 has just signed on to the cellular system 80. The database of system 40 is used to determine how many Pager Tasks 300 need to be started in response to a caller's call (in addition to determining how those pages are to be made) and how many Forward Leg Tasks 500 need to be started in response to a callers call (in addition to determining to which telephone addresses the forward leg calls are to be addressed). This information may be stored as a normal schedule for the subscriber, as previously mentioned. The SS-7 messages, such as the message noted above, can be used to override the preprogrammed schedule. For example, at 10:00 A.M. weekdays the preprogrammed schedule "thinks" that the subscriber is in his or her office. However, at 10:05 A.M. the system receives a SS-7 message indicating that the cellular telephone in the subscriber's automobile was turned on. The database should indicate to the system how to react to this situation. Possible reactions might be:

(1) Do nothing;

(2) Switch Forwarding Tasks to the cellular telephone number, unless the subscriber is on the system;

(3) If the subscriber is on the system, emulate a Call Waiting function and tell the subscriber in the a new conference facility that their automobile (assuming that is where the cellular telephone in question is located) may be leaving the premises without their permission;

(4) During preprogrammed time periods, telephone the subscriber at one or more preprogrammed telephone number using the Forward Leg Tasks to tell them (using the digitized speech capabilities previously described) in a conference facility that their automobile (assuming that is where the cellular telephone in question is located) may be leaving the premises without their permission.

The the SS-7 messaging service can also be used to advise the system 40 when the subscriber powers down the cellular telephone. The SS-7 signally specification does not explicitly provide a power down message, but the system 40 can learn about a power down situation by periodically sending a packet polling the cellular system about the status of the cellular telephone. If the cellular phone is no longer available, the system 40 will know that a power down must have occured. The database preferably tells the system how to react. For example, then the system may revert back to the subscriber's preprogrammed schedule.

Those skilled in the art will appreciate that in the described system 40, when the subscriber is barging into a call, that they are recognized by the system as the subscriber and are given certain privileges. For example, in the disclosed embodiment, only the subscriber can force the forward leg(s) to disconnect by entering a code (##8)—see steps 282 and 283 on FIG. 4*b*4. It is felt that consumers resist having to always use FINs and therefore the disclosed system does not require a PIN on the forwarding leg indeed it is felt that it would often be dysfunctional. However, one modification which probably would be accepted in the marketplace would be to include the ability for the subscriber to enter an optional PIN on a forwarding leg. Thus, after the party answering the telephone on a forwarding leg enters the valid PIN for the subscriber who is being sought, they would be giving subscriber status (i.e. the ability to force other forwarding legs to disconnect). Another modification which might be desirable would be to automatically give subscriber status to persons answering the telephone at certain forwarding numbers (and perhaps only at certain times), as stored in the database. For example, if a call is forwarded to the telephone 76 on the subscriber's desk at their office, the database could tell the system to assume that the party answering that telephone is the subscriber and to give them subscriber status. On the other hand, if a call is forwarded to the telephone 16 at the subscriber's home, the database could tell the system to assume that the party answering that telephone is the not subscriber unless they enter a PIN. These assumptions could be, of course, reversed, by making appropriate entries in the database.

The changes needed to the disclosed flow charts to implement such capabilities are not extensive. For example, the loop comprising steps 531 and 534 on Page 4*e*2 can be enlarged to include a test for a valid subscriber FIN and to set a "subscriber on forwarding leg" variable true if detected (of course, the database could set that variable true without the need of the answeree to enter a PIN). This loop would then test for a code (##8) only if the "subscriber on forwarding leg" variable is true, and when the ##8 code is detected in the loop, then forwarding would be set inactive for the other forwarding legs to bring them down by the Forward Leg Disconnect Task(s) 600 which would be running for each forwarding leg 9, 9' (for course, the forwarding leg on which the subscriber has now been identified would not be brought down by this action since forwarding would remain active on that leg).

Having described a preferred embodiment of the invention, further modification and changes may now suggest themselves to those skilled in the art. The invention, therefore, is not to be limited to the disclosed embodiments as many changes and modifications will doubtless occur. Rather, the invention is to be defined by the scope of the accompanying claims.

What is claimed is:

1. A communications system comprising:

(a) a central processing unit;

(b) a communications interface for connection to a telephone system and to a signaling system, the signaling system communicating with a plurality of subscribers;

(c) apparatus connecting said communications interface with said central processing unit, said central processing unit operating under program control to detect an inbound call from a caller directed to one of said subscribers via said communication interface, to initiate while the inbound call is still active a plurality of communications seeking said one of said subscribers in response to said inbound call, at least one of said communications including a signal to said one of said subscribers via said signaling system and at least another one of said communications including a telephone call placed via said communications interface to a telephone apparatus at an expected location of said one of said subscribers.

2. The system of claim 1 wherein said telephone apparatus is at an expected location which is a selectable one of a plurality of different locations.

3. The system of claim 2 wherein the plurality of communications is initiated contemporaneously.

4. A communications system comprising:

(a) a central processing unit;

(b) a communications interface for connection to a telephone system and to a signaling system, the signaling system including a central transmitter which communicates with a plurality of receiving units carried by subscribers;

(c) apparatus connecting said communications interface and with said central processing unit, said central processing unit operating under program control to detect an inbound call from a caller directed to a telephone network address associated with one of said subscribers via said communication interface, to initiate while the inbound call is still active a plurality of communications via said interface seeking said one of said subscribers via different communication paths in response to said inbound call, at least one of said communications including a signal to said one of said subscribers via said signaling system and another of said communications including a telephone call placed to a different telephone network address via said communications interface.

5. The system of claim 4 wherein said expected location is a selectable one of a plurality of different locations.

6. The system of claim 5 wherein the plurality of communications is initiated contemporaneously.

7. A method of placing a caller into telecommunication with a subscriber, the method comprising the steps of:
   (i) detecting receipt of an inbound call from said caller directed to said subscriber;
   (ii) in response to receipt of said inbound call, while the inbound call is still active initiating both a page to said subscriber and a separate forward leg call to a stored telephone address of a telephone apparatus at an expected location of said subscriber;
   (iii) placing said forward leg call in telecommunication with said caller, if answered; and
   (iv) detecting receipt of a call from said subscriber in response to said page, and placing said subscriber in telecommunication with said caller.

8. A method of placing a caller into telecommunication with a subscriber, the method comprising the steps of:
   (i) detecting receipt of an inbound call from said caller directed to said subscriber:
   (ii) in response to receipt of said inbound call while the inbound call is still active initiating both a page to said subscriber and a separate forward leg call to a stored telephone address;
   (iii) placing said forward leg call in telecommunication with said caller, if answered;
   (iv) detecting receipt of a call from said subscriber in response to said page, and placing said subscriber in telecommunication with said caller; and
   (v) when said caller, said subscriber and a party on said forward leg are all in telecommunication with each other, sensing a command entered by said subscriber to disconnect said party.

9. A method of placing a caller into telecommunication with a subscriber, the method comprising the steps of:
   (a) detecting receipt of an inbound call from said caller directed to said subscriber;
   (b) in response to receipt of said inbound call, while the inbound call is still active initiating both a page to said subscriber and a separate forward leg call to a stored telephone address;
   (c) placing said forward leg call in telecommunication with said caller, if answered; and
   (d) detecting receipt of a call from said subscriber in response to said page, and placing said subscriber in telecommunication with said caller; and
   (e) when at least two of (i) said caller, (ii) said subscriber and (iii) a party on said forward leg are in telecommunication with each other, sensing a command entered by at least one of said two to add a further forward leg to said telecommunication and adding said further forward leg in response to said command.

10. The method of placing a caller into telecommunication with a subscriber as claimed in claim 9, wherein the sensing step senses a command entered by any party in the telecommunication to add a further forward leg to said telecommunication.

11. The method of placing a caller into telecommunication with a subscriber as claimed in claim 9, wherein said further forward leg is a connection made to a voice mail system.

12. The method of claim 7 wherein said stored telephone address is programmable to correspond to a telephone apparatus at an expected present location of said one of said subscribers, said expected location being a selected one of a plurality of locations.

13. A method of placing a caller into telecommunication with a subscriber, the method comprising the steps of:
   (a) detecting receipt of an inbound call from said caller directed to said subscriber;
   (b) in response to receipt of said inbound call, while the inbound call is still active initiating a page to said subscriber and multiple forward leg calls to different stored telephone addresses;
   (c) placing said forward leg calls in telecommunication with said caller, if answered; and
   (d) detecting receipt of a call from said subscriber in response to said page, and placing said subscriber in telecommunication with said caller.

14. The method of claim 13, wherein said multiple forward leg calls are initiated to different stored telephone addresses simultaneously.

15. The method of claim 14, wherein one of said different locations is a paging system and wherein another of said locations is a speaker whereat an audible page is delivered.

16. The communications system of claim 2, wherein said signaling system is a paging system and wherein said subscribers carry pagers which respond to signals broadcast by said paging system.

17. The communications system of claim 2 wherein said signaling system comprises a computer controlled voice generator and a transducer for reproducing sounds generated by said voice generator, said central processing unit controlling said voice generator, in combination with said transducer, to generate audible signals corresponding to said communications.

18. The communications system of claim 2 wherein said central processing unit, in response to said one of said subscribers confirming receipt via said communication interface of at least one of said communications, placing said caller and said at least one of said subscribers into direct communication.

19. A method of placing parties into direct voice communication with each other via telephone equipment, said method comprising the steps of:
   (a) detecting an inbound call from a calling party intended for a called party;
   (b) processing said inbound call by initiating while the inbound call is still active both a page to said called party and at least one forward leg call to at least one expected location of said called party, said expected location being a selected one of a plurality of locations; and
   (c) during a period of time which starts after said inbound call is detected in step (a) and which ends at least when the inbound call is terminated, detecting an incoming call from the called party and, in response thereto, connecting said calling party and said called party.

20. The method of placing a caller into telecommunication with a subscriber as claimed in claim 12, and while in telecommunication with the first mentioned caller, detecting receipt of a new call from a new caller directed to said subscriber, sending a signal to said subscriber indicating that said new call has been detected and responsive to a command entered by said subscriber, toggling said subscriber between the first mentioned caller and the new caller.

21. The method of placing a caller into telecommunication with a subscriber as claimed in claim 12, and wherein said caller, said subscriber and a party on said forward leg are all in telecommunication with each other, sensing said subscriber disconnecting and allowing said party and said caller to remain in telecommunication in spite of said subscriber disconnecting.

22. The method of claim 12, further including the steps of sensing a message from a public telephone system advising that a cellular telephone connected therewith has been powered up and in response thereto changing said telephone address.

23. The method of claim 12 further including the steps of sensing a message from a public telephone system advising that a cellular telephone connected therewith has been powered up and in response thereto telephoning said subscriber at predetermined telephone address to deliver a predetermined courtesy message advising them of that fact.

24. The method of claim 12, wherein said stored telephone address is stored in a database along with a schedule and wherein, in step (ii), said stored telephone address is selected from said database in accordance with said schedule.

25. The method of claim 12, wherein in step (ii), multiple pages initiated concurrently to different locations.

26. The method of claim 12 wherein the page and separate forward leg calls are initiated contemporaneously.

27. The method of claim 26 wherein said page and said at least one forward leg calls are initiated contemporaneously.

28. The method of claim 26 wherein the processing step further includes terminating the forward leg call if it is not answered within some time period and thereafter further processing the call from the calling party.

29. The method of claim 26 wherein in response to detecting the incoming call from the called party, the processing of step (b) is terminated if the forward leg call has not been answered.

* * * * *